(12) United States Patent
Dacre-Wright et al.

(10) Patent No.: US 10,089,893 B2
(45) Date of Patent: Oct. 2, 2018

(54) METHOD AND SYSTEM FOR DETERMINING A MINIMUM-THRUST SYNCHRONOUS DESCENT AND REJOINING PROFILE FOR AN AIRCRAFT

(71) Applicant: THALES, Courbevoie (FR)

(72) Inventors: Benoît Dacre-Wright, Toulouse (FR); Jérôme Sacle, Toulouse (FR); Cédric D'Silva, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/727,468

(22) Filed: Oct. 6, 2017

(65) Prior Publication Data
US 2018/0114452 A1 Apr. 26, 2018

(30) Foreign Application Priority Data
Oct. 20, 2016 (FR) ..................... 16 01522

(51) Int. Cl.
*G08G 5/02* (2006.01)
*G05D 1/06* (2006.01)
(Continued)

(52) U.S. Cl.
CPC ........... *G08G 5/025* (2013.01); *G05D 1/0607* (2013.01); *G05D 1/0676* (2013.01); *G05D 1/101* (2013.01);
(Continued)

(58) Field of Classification Search
CPC .. G08G 5/0013; G08G 5/0021; G08G 5/0039; G08G 5/0052; B64C 39/024; G05D 1/0607; G05D 1/0676
(Continued)

(56) References Cited

U.S. PATENT DOCUMENTS 8,078,341 B2 12/2011 Gutierez-Castaneda et al.
8,332,145 B2 12/2012 Dacre-Wright et al.
(Continued)

OTHER PUBLICATIONS

Wissem Maazoun, "Conception et analyse d'un système d'optimisation de plans de vol pour les avions" [Design and analysis of a system for optimizing flight plans for aircraft], University of Montreal, Apr. 2015.

*Primary Examiner* — Tan Q Nguyen
(74) *Attorney, Agent, or Firm* — Baker & Hostetler LLP

(57) ABSTRACT

A method for determining a minimum-thrust descent and rejoining profile in respect of a target point by an aircraft comprises a first step of computing an energy differential of the aircraft in the air $\Delta E_a$ between a first initial state of the aircraft at an initial geodesic point Qi and a second final state of the aircraft at the final arrival target point Qf. The method comprises a second step of adjusting an adjustable modelled profile of altitude $h_m(t)$ and of air speed $Va_m(t)$ of the aircraft with the aid of parameters so the adjusted modelled profile of altitude $h(t)$ and of air speed $Va(t)$ of the aircraft ensures the consumption of the variation of energy of the aircraft in the air $\Delta E_a$ in a fixed required timespan $\Delta t_{required}$ and a fixed required altitude variation $t_f - t_i$ in the required time timespan, the aircraft operating permanently in an engine regime with constant and minimum thrust. The method comprises a third step of determining a lateral geodesic trajectory of the aircraft on the basis of the adjusted altitude profile $h(t)$, of the adjusted air speed profile $Va(t)$ and of the knowledge of the speeds of the winds in the aircraft's scheduled geographical traversal zone.

16 Claims, 13 Drawing Sheets

(51) Int. Cl.
*G08G 5/00* (2006.01)
*G05D 1/10* (2006.01)
*B64C 39/02* (2006.01)

(52) U.S. Cl.
CPC ......... *G08G 5/0013* (2013.01); *G08G 5/0021* (2013.01); *G08G 5/0039* (2013.01); *G08G 5/0052* (2013.01); *G08G 5/0069* (2013.01); *G08G 5/0091* (2013.01); *B64C 39/024* (2013.01)

(58) Field of Classification Search
USPC ........................................................ 701/121
See application file for complete search history.

(56) References Cited

U.S. PATENT DOCUMENTS

| | | |
|---|---|---|
| 8,386,158 B2 | 2/2013 | Blanchon et al. |
| 8,457,872 B2 | 6/2013 | Deker |
| 8,515,598 B2 | 8/2013 | Louise et al. |
| 8,744,768 B2 | 6/2014 | Gutierez-Castaneda et al. |
| 8,862,373 B2 | 10/2014 | Dacre-Wright et al. |
| 9,026,275 B1* | 5/2015 | Young .................... G08G 5/003 701/11 |
| 9,188,978 B2 | 11/2015 | Sacle et al. |
| 2012/0146816 A1* | 6/2012 | Bourret ................ G05D 1/0077 340/963 |
| 2015/0120100 A1* | 4/2015 | Sacle .................... G01C 21/20 701/18 |
| 2016/0063867 A1 | 3/2016 | Zammit et al. |

\* cited by examiner

METHOD AND SYSTEM FOR DETERMINING A MINIMUM-THRUST SYNCHRONOUS DESCENT AND REJOINING PROFILE FOR AN AIRCRAFT

CROSS-REFERENCE TO RELATED APPLICATION

This application claims priority to foreign French patent application No. FR 1601522, filed on Oct. 20, 2016, the disclosures of which are incorporated by reference in their entirety.

FIELD OF THE INVENTION

The present invention relates to a method for determining a minimum-thrust descent and rejoining profile in respect of a target point constrained in time by an aircraft, and the system for implementing the said method.

The field of application of the method according to the invention is in particular that of trajectory planning and guidance of an aircraft in the descent phases, as well as management of the air traffic in end of en-route or airport approach procedures. The method of the invention can also apply to mission management of pilotless aircraft, if the latter are subject to constraints in respect of flight time or of insertion into traffic with other aircraft.

BACKGROUND

In current air traffic control practices, controllers allocate speeds to aircraft, or make them execute lateral manoeuvres, to ensure efficient sequencing of the aircraft in the terminal control zones. Various tools have been devised to aid the controller in this task. The aircraft's flight predictions make it possible to estimate its flight time and its time of arrival at certain characteristic points of the approach. Tools such as an Arrival MANager AMAN then make it possible to display the arrival sequence of the various aircraft, and to identify for each a time to be lost ("Time To Loose") or to be gained ("Time To Gain") in order to establish a runway sequencing of the aircraft which satisfies the required rate, while maintaining the separation necessary for flight safety. The choice of the speed setpoint or lateral manoeuvre setpoint is assessed by the controller according to the timespan to be gained or lost, by taking into account the surrounding traffic. The information regarding vertical prediction of the aircraft, available through the ADS-C (Automatic Dependent Surveillance Broadcast) protocol in the form of EPP (Extended Projected Profile), is today not taken into account in determining the lateral or speed setpoints.

Current aircraft are capable of determining a descent profile optimized according to an economic criterion, often a cost index, achieving a compromise between fuel consumption and flight times, sometimes summarized in the form of a performance criterion. The descent speed profile, as well as the descent start point, are determined so as to maximize the use of a minimum thrust in the course of descent, while satisfying the altitude and speed constraints required by the flight plan. These constraints may arise from the procedures defined in a navigation database and inserted into the flight plan, or may have been input by the pilot, on request or otherwise of the ground operator.

When an arrival time constraint is required (also called RTA ("Required Time of Arrival") or CTA/CTO ("Constrained Time of Arrival/Overfly")), the embedded Flight Management System FMS may compute a new speed profile, and the associated descent profile, making it possible to satisfy the temporal constraint. The RTA speed computation profiles can be ensured in several ways, either by searching for a cost index which satisfies the constraint as described in patent application U.S. Pat. No. 8,744,768, or according to more elaborate speed strategies, for example by using the temporal profiles corresponding respectively to a flight at minimum, maximum, or economic speed, as described in patent application U.S. Pat. No. 8,332,145. It is also possible to automatically compute a lateral manoeuvre ensuring the desired arrival time as described in patent application U.S. Pat. No. 8,457,872. The criterion for determining these manoeuvres remains the time constraint, without taking energy management into account.

Within the framework of inter-aircraft synchronization operations of ASAS ("Airborne Separation Assistance System") or FIM ("Flight deck based Interval Management") type, using the data exchanged between aeroplanes by the ADS-B protocol, lateral manoeuvres and speed manoeuvres have been devised to acquire and then remain at a temporal or spatial spacing behind another aircraft. A lateral manoeuvre consists in determining, on the current route or along the current heading, a point for turning towards a specified point, making it possible to acquire the required spacing as described in applications U.S. Pat. No. 8,386,158, U.S. Pat. No. 8,078,341 or U.S. Pat. No. 8,862,373. Next, a speed adjustment is applied so as to refine and maintain the specified spacing. But the turning point, like the speed setpoint, are established so as to obtain the required spacing, without taking into account the impact on the energy or the descent capability of the aircraft.

Moreover, methods have been defined for automatically ensuring the lateral and vertical rejoining of a flight plan and of a reference descent profile as described in patent application U.S. Pat. No. 8,515,598, optionally while maximizing the use of the minimum thrust as described in application U.S. Pat. No. 9,188,978. During these lateral and vertical capture manoeuvres, the energy of the aeroplane can be taken into account in order to adjust the vertical profile, and the required distance in order to ensure stabilization can be evaluated. In particular, the trajectory can be modified and lengthened in order to ensure sufficient length for stabilization of the aircraft before landing. However, these methods do not take into account an optional time constraint to achieve the best compromise between speed and length of trajectory, in such a way as to maintain a descent hold under minimum thrust.

Taking a time constraint into account in the computation of an energy-optimized descent profile has also been proposed in patent application U.S. Pat. No. 9,026,275 but acting on the altitude, speed, thrust parameters over a predetermined lateral trajectory, without using the lateral modification of the trajectory as optimization degree of freedom.

Finally, patent application US 20160063867, published on 3 Mar. 2016, describes an adjustment of the speed and of the lateral trajectory, in the presence of a fixed temporal constraint on a target rejoining point. The method described consists in monitoring the energy and the transit time at a downstream point of the descent, in such a way as to ensure compliance with the flight plan. The energy recovery system, described by this document, implements a computation method which identifies the necessary adjustments of trajectory control parameters so as to force the aircraft to follow profiles in respect of energy recovery and of time at the arrival target point using a minimum lengthening of the lateral trajectory. The method described can lead to adjustments of the speed and of the lateral trajectory but also includes the possibility of additional thrust or drag. The objective claimed in this document is to secure energy compliance by priority, and subsidiarily if possible, compliance with the required flight time, without systematically seeking economic optimization. Furthermore, the method describes neither the manner of computing the vertical profile, nor the way in which account is taken of the effects of the wind and/or of the lateral trajectory on this profile.

This method does not therefore specify how, in the presence of an appreciable modification of the arrival time scheduled in the flight time, a lateral manoeuvre can be devised so as to comply with the new arrival time while achieving the most economically efficient compromise in terms of fuel consumption.

A first technical problem is to provide a method for determining a minimum-thrust descent and rejoining profile in respect of a target point by an aircraft in which the fuel consumption along the profile is minimized without energy surfeit of the aircraft and while complying with the fixed arrival time constraint at the target descent and rejoining point.

A second technical problem is to provide a method for determining a minimum-thrust descent and rejoining profile, which solves the first technical problem and is simple to implement.

SUMMARY OF THE INVENTION

For this purpose, the subject of the invention is a method for determining a minimum-thrust descent and rejoining profile in respect of a target point by an aircraft, the permanently minimum-thrust descent profile being defined from a first initial state of the initial aircraft up to a second final state of the aircraft temporally constrained, the first initial state of the aircraft comprising a first geodesic position Qi of departure, an initial time ti, a first initial altitude hi, a first initial speed of the aircraft $\vec{Vi}$ relative to the ground and a first wind speed $\vec{Wi}$, the second final state of the aircraft comprising a second geodesic position Qf of arrival at the target point, a final constraint time tf, a second final altitude hf, a second final speed of the aircraft $\vec{Vf}$ relative to the ground and a second wind speed $\vec{Wf}$, the said method being characterized in that it comprises:

a first step of computing an energy differential of the aircraft in the air $\Delta E_a$ between the first initial state of the aircraft and the second final state of the aircraft; and a second step, subsequent to the first step consisting in
  providing an adjustable modelled profile of altitude $h_m(t)$ and of air speed $Va_m(t)$ of the aircraft, corresponding to an air descent strategy which permanently ensures an engine regime at minimum thrust and using one or more adjustable parameters, and then in
  adjusting the adjustable parameter or parameters so that an adjusted profile of altitude h(t) and of air speed va(t) of the aircraft ensures the consumption of the variation of energy of the aircraft in the air $\Delta E_a$ within the required timespan $\Delta t_{required}$, and the required altitude variation $h_i - h_f$ within the required timespan with permanently an engine regime with constant and minimum thrust; and a third step, subsequent to the second step, of determining
  a lateral geodesic trajectory P(t) of the aircraft on the basis of the adjusted altitude profile h(t), of the adjusted air speed profile Va(t) and of the knowledge of the speeds of the winds in the aircraft's scheduled geographical traversal zone.

According to particular embodiments, the method for determining descent and rejoining under minimum thrust of a target point by an aircraft comprises one or more of the following characteristics:

the first step consists in determining the differential of the energy of the aircraft in the air $\Delta E_a$ as the difference $E_{ai} - E_{af}$ between the energy of the aircraft in the air in the initial state $E_{ai}$ and the energy of the aircraft in the air in the final state $E_{af}$, the energy of the aircraft in the air $E_{ai}$ in the initial state being equal to the sum $E_{Ti} + E_{Wi}$ of the total energy $E_{Ti}$ of the aircraft in the initial state and of a first corrective term $E_{Wi}$ for the effect of the winds in the initial state on the air slope followed by the aircraft, and the energy of the aircraft in the air $E_{af}$ in the final state being equal to the sum $E_{Tf} + E_{Wf}$ of the total energy $E_{Tf}$ of the aircraft in the final state and of a second corrective term $E_{Wf}$ for the effect of the winds in the final state on the air slope followed by the aircraft, with $$E_{Ti} = \frac{1}{2}m(t_i)V_i^2 + m(t_i) \cdot g \cdot h_i \text{ and}$$

$$E_{Wi} = -\frac{1}{2}m(t_i)W_i^2 - m(t_i) \cdot (\vec{V}_i - \vec{W}_i) \cdot \vec{W}_i \text{ and}$$

$$E_{Tf} = \frac{1}{2}m(t_f) \cdot V_f^2 + m(t_f) \cdot g \cdot h_f \text{ and}$$

$$E_{Wf} = -\frac{1}{2}m(t_f) \cdot W_f^2 - m(t_f) \cdot (\vec{V}_f - \vec{W}_f) \cdot \vec{W}_f$$

and $m(t_i)$, $m(t_f)$ denoting the mass of the aircraft respectively at the initial instant $t_i$ and the final instant $t_f$;

the adjustable modelled profile of altitude $h_m(t)$ and of air speed $Va_m(t)$ of the aircraft is decomposed into a temporal succession of a number N, greater than or equal to 2, of adjustable elementary profiles of altitude $h_m(k,t)$ and of air speed $Va_m(k,t)$ of the aircraft, the index k being an identification index identifying the order of temporal succession of the adjustable elementary profiles $h_m(k, t)$, $Va_m(k,t)$ lying between 1 and N; and the elementary profile $h_m(1, t)$ and $Va_m(1, t)$ evolves over a first elementary time interval IT(1) lying between the initial time ti and a first intermediate time t(2) forming respectively the times associated with the first initial state and with a first intermediate state of the aircraft; and for k varying between 2 and N−1, the elementary profile $h_m(k, t)$ and $Va_m(k, t)$ evolves over a k-th elementary time interval IT(k) lying between a (k−1)-th intermediate time t(k) and a k-th intermediate time t(k+1) forming respectively the times associated with the (k−1)-th intermediate state and with the k-th intermediate state of the aircraft; and the elementary profile $h_m(N, t)$ and $Va_m(N, t)$ evolve over an N-th elementary time interval IT(N) lying between the (N−1)-th intermediate time t(N) and the final time tf forming respectively the times associated with the (N−1)-th intermediate state and with the second final state of the aircraft; and two consecutive intervals IT(k), IT(k+1) for k varying from 1 to N−1 are contiguous, the adjustable profiles $h_m(k, t)$ and $Va_m(k,t)$, for k varying from 1 to N correspond to phases Φ(k) of descent under constant and minimum engine regime, the phases of descent under constant and minimum engine regime included in the set formed by the descent phases with constant speed CAS, the constant-acceleration phases and the deceleration phases with constant energy ratio ER;

for each descent phase Φ(k) and the corresponding adjustable profile $h_m(k, t)$ and $Va_m(k,t)$, k varying from 1 to N, the start instant of the interval IT(k), t(k), the end instant of the interval IT(k), t(k+1), the altitudes $h_m(t(k))$, and $h_m(t(k+1))$, the air speeds of the aircraft $Va_m(k, t(k))$ and $Va_m((k,t(k+1))$, the excess powers $SEP_m(k, t(k))$, $SEP_m(k, t(k+1))$, corresponding respectively to the two instants t(k) and t(k+1) are linked by the relation:

$$\frac{SEP_m(k, t(k)) + SEP_m(k, t(k+1))}{2} \cdot (t(k+1) - t(k)) =$$
$$[h_m(t(k+1)) - h_m(t(k))] + \frac{Vam^2(k, t(k+1)) - Vam^2(k, t(k))}{2g}$$

for k varying from 1 to N, when the adjustable profiles $h_m(k, t)$ and $Va_m(k,t)$ correspond to a phase $\phi(k)$ of descent with bounded constant acceleration and under constant and minimum engine regime, the duration $\Delta t_m(k)$ of the k-th elementary interval IT(t) and the altitude variation $\Delta h_m(k)$ over the said interval IT(k) satisfy the equations:

$$\Delta t_m(k) = \frac{V_{am}(k, t(k+1)) - V_{am}(k, t(k))}{A} \text{ and}$$

$$\Delta h_m(k) =$$
$$\left(\frac{SEP_m(k, t(k)) + SEP_m(k, t(k+1))}{2A} - \frac{Vam(t(k)) + Vam(t(k+1))}{2g}\right) \cdot$$
$$(V_{am}(t(k+1)) - V_{am}(t(k)))$$

when the adjustable profiles $h_m(k, t)$ and $Va_m(k,t)$ correspond to a phase $\phi(k)$ of descent with constant CAS speed or Mach number and under constant and minimum engine regime, the duration $\Delta t_m(k)$ of the k-th elementary interval IT(t) and the altitude variation $\Delta h_m(k)$ over the said interval IT(k) satisfy the equations $$\Delta h_m(k) = h_m(k, t(k+1)) - h_m(k, t(k)) \text{ and}$$

$$\Delta t_m(k) = \frac{2}{SEP_m(k, t(k)) + SEP_m(k, t(k+1))} \cdot$$
$$\left(\Delta h_m(k) + \frac{Vam^2(t(k+1)) - Vam^2(t(k))}{2g}\right)$$

when the adjustable profiles h(k, t) and Va(k,t) correspond to a phase $\Phi(k)$ of descent under deceleration with constant energy ratio ER and under constant and minimum engine regime, the duration $\Delta t(k)$ of the k-th elementary interval IT(t) and the altitude variation $\Delta h(k)$ over the said interval IT(k) satisfy the equations:

$$\Delta t_m(k) = \frac{2}{ER \cdot (SEP_m(k, t(k)) + SEP_m(k, t(k+1)))} \cdot$$
$$\left(\frac{Vam^2(t(k+1)) - Vam^2(t(k))}{2g}\right) \text{ and}$$
$$\Delta h_m(k) = \frac{(1 - ER)}{ER} \cdot \frac{(Vam^2(t(k+1)) - Vam^2(t(k)))}{2g}$$

the parametric model of profile of altitude h(t) and of air speed va(t) of the aircraft to be adjusted comprises three successive phases: a first phase of acceleration/deceleration to a desired speed CAS, and then a second phase at the constant desired speed CAS, and then a third phase of acceleration/deceleration to the final speed, the desired speed CAS and the durations of the three phases being adjusted so as to satisfy the total duration constraint $\Delta t_{required}$ as well as the duration of the altitude variation constraint $h_t - h_f$;

the modelled profile of altitude h(t) and of air speed Va(t) of the aircraft to be adjusted comprises three successive phases: a first phase at the initial speed CAS on a first altitude slice $\Delta h(1)$ with an adjustable duration making it possible to vary a deceleration start instant, and then a second phase of deceleration from the initial speed CAS to the final speed CAS, and then a third phase of descent at the final speed CAS until the final altitude, the altitude variation $\Delta h(1)$ before the deceleration is adjusted iteratively to obtain the duration of the first phase;

the third step comprises a first sub-step in the course of which, horizontal positions of departure and arrival, $P_{ai}$ and $P_{af}$, within the air mass are determined on the basis of departure and arrival horizontal geodesic positions, Pi and Pf, and of the horizontal speed of the wind $\overrightarrow{W_{hor}}(h)$ by assuming that the speed and the direction of the wind depend only on the altitude h and by using the relation:

$$\overrightarrow{P_{ai}P_{af}} = P_i P_f - \int_{ti}^{tf} \overrightarrow{W_{hor}}(h(t))dt$$

and a second sub-step of determining a required lateral distance in the air to be travelled $D_a$ on the basis of the air speed profile of the aircraft Va(t) and of the air slope $\gamma(t)$ by using the equation:

$$D_a = \int_{t1}^{t2} V_a(t) \cdot \cos(\gamma(t)) dt$$

a third sub-step of determining a lateral trajectory in the air Pa(t) joining the departure and arrival horizontal positions, Pai and Paf and taking into account the vectors of initial and final air speed, the length of the lateral trajectory in the air Pa(t) being constrained by being set equal to the required lateral distance in the air to be travelled $D_a$, a fourth sub-step of computing a geodesic lateral trajectory Pa(t) deduced on the basis of lateral trajectory in the air Pa(t) and of the wind chart;

the third step comprises a first sub-step of providing a preliminary lateral trajectory of a predetermined type adjustable by modification of a parameter, and a wind model dependent on the altitude and optionally the horizontal position and optionally the time, and a second sub-step of adjusting the at least one parameter of the preliminary lateral trajectory in the course of which the at least one adjustment parameter is modified so that the horizontal geodesic distance travelled along the preliminary lateral trajectory, adjusted by taking account of the winds, terminates precisely at the final geodesic position $P_f$, and a third sub-step of determining a required horizontal geodesic distance on the basis of the profiles of altitude h(t) and of air speed of the aircraft Va(t), by evaluating at each instant t the modulus $\|\overrightarrow{V_{g,hor}}\|$ of the horizontal geodesic speed of the aircraft on the basis of the air speed Va(t) and of components of the speed of the wind (XW(t), TW(t)), and by integrating over time the modulus of the horizontal geodesic speed according to the equations:

$$D = \int_{t1}^{t2} \|\overrightarrow{V_{g,hor}}\| dt = \int_{t1}^{t2} (\sqrt{V_a^2 - XW^2(t)} + TW(t)) dt$$

XW(t) and TW(t) denoting respectively the transverse component and the longitudinal component of the wind at the instant t;

the method for determining a minimum-thrust descent and rejoining profile in respect of a target point by an aircraft described hereinabove furthermore comprises a fourth step, subsequent to the third step, of corrections of the profiles of altitude h(t) and of air speed of the aircraft Va(t), and of the lateral geodesic trajectory, determined respectively in the second and third steps, which take into account, a first effect $\varepsilon_1(t)$ of the wind gradients in the computation of the excess power in the air SEP and/or a second effect $\varepsilon_2(t)$ of the turning manoeuvres on the load factor which modifies the apparent mass in the computation of the variation of the excess power in the air SEP(t), the general expression for the excess power in the air SEP(t) being written in the form:

$$SEP(t) = \frac{\overrightarrow{V_a(t)}}{g} \cdot \left( \frac{d\overrightarrow{V_a(t)}}{dt} + \varepsilon_1(t) \right) + \frac{dh(t)}{dt}(1 + \varepsilon_2(t))$$

where g denotes the acceleration due to gravity in the vicinity of the surface of the Earth;

the fourth step is an iterative process, comprising first, second, third, fourth sub-steps executed in a loop; and the first sub-step, executed initially at the end of the third step and subsequent to the fourth sub-step when at least one iteration has been decided in the course of the third sub-step, consists in determining in a conventional manner a temporal evolution of a state vector of the aircraft including at least the altitude h(t), the air speed of the aircraft Va(t), the geodesic distance travelled D(t) along the current geodesic trajectory P(t), initially determined at the start of a first iteration in the third step or determined in the course of the fourth sub-step of the fourth step, by taking into account the wind gradients and the load factor of the turning manoeuvres in the computation of the excess power variation SEP(t) until either the final position, or the final altitude is reached at a stopping point of the current geodesic trajectory; and the second sub-step, executed subsequent to the first sub-step, consists in the fact that raw disparities $\delta D_1$, $\delta t_1$, $\delta h$, $\delta V_a$, relating to the geodesic distance travelled, the time, the altitude, the air speed, are evaluated between the state of the aircraft, considered at the stopping point and computed by taking into account the correction effects, and the desired final state, and in the fact that refined disparities $\delta D_2$, $\delta t_2$, relating to geodesic distance travelled and time, are evaluated as a function of the raw disparities $\delta D_1$, $\delta t_1$, between the state of the aircraft, considered at the stopping point and computed by taking into account the correction effects, and the desired final state; and the third sub-step of test and decision of execution of an iteration of the loop, executed subsequent to the second sub-step, consists in the fact that the refined disparities $\delta D_2$, $\delta t_2$ of geodesic distance travelled and of time of arrival at the stopping point are compared with a loop exit stopping threshold $\varepsilon$, a branching is carried out to the fourth sub-step when at least one of the refined disparities $\delta D_2$, $\delta t_2$ is greater than or equal to the stopping threshold, and a stopping of the fourth step is carried out when the two refined disparities $\delta D_2$, $\delta t_2$ are strictly less than the threshold, the fourth step is terminated; and the fourth sub-step, executed when at least one of the refined disparities $\delta D_2$, $\delta t_2$ is greater than or equal to the stopping threshold, consists in the fact that the current profile of altitude h(t) and of air speed Va(t) is readjusted by taking into account the refined time disparity and by reusing the method for adjusting the profile of the second step, and then the lateral trajectory manoeuvre is readjusted by taking into account the refined distance disparity and by reusing the method for adjusting the lateral trajectory of the third step to obtain an updated current geodesic trajectory;

the refined disparities $\delta D_2$, $\delta t_2$ of geodesic distance travelled and of time of arrival at the stopping point are functions of the raw disparities $\delta D_1$, $\delta t_1$, between the state of the aircraft, considered at the stopping point and computed by taking into account the correction effects, and the desired final state, according to the relations:

$$\delta t_2 = \delta t_1 + \frac{\delta h + \frac{1}{g}\delta V_a\left(V_f + \frac{\delta V_a}{2}\right)}{SEP_f}$$

and $$\delta D_2 = \delta D_1 + \frac{1}{2} \cdot \delta t_2 \cdot V_f$$

$V_f$ and $SEP_f$ denoting respectively the final speed and the excess power variation at the stopping point $P(t_f)$;

the aircraft is included in the set of aeroplanes piloted on-board manually or in automatic mode and of drones piloted remotely manually or in automatic mode.

The subject of the invention is also a system for determining a minimum-thrust descent and rejoining profile in respect of a target point by an aircraft, the permanently minimum-thrust descent profile being defined from a first initial state of the initial aircraft up to a second final state of the aircraft constrained temporally by a final arrival time tf or a required temporal timespan $\Delta t_{required}$, the first initial state of the aircraft comprising a first geodesic position Qi of departure, an initial time ti, a first initial altitude hi, a first initial speed of the aircraft $\overrightarrow{Vi}$ relative to the ground and a first wind speed $\overrightarrow{Wi}$, the second final state of the aircraft comprising a second geodesic position Qf of arrival at the target point, a final constraint time tf, a second final altitude hf, a second final speed of the aircraft $\overrightarrow{Vf}$ relative to the ground and a second wind speed $\overrightarrow{Wf}$, the said determining system comprising a database of the performance of the aircraft, a means for providing meteorological data of the environment in which the aircraft is deploying, a ground station for providing the required final time or a required temporal timespan to the aircraft, and one or more electronic computers for computing the minimum-thrust descent and rejoining profile in respect of a target point, the said determining system being configured to:

in a first step, compute an energy differential of the aircraft in the air $\Delta E_a$ between the first initial state of the aircraft and the second final state of the aircraft, and then in a second step, provide an adjustable modelled profile of altitude $h_m(t)$ and of air speed $V_{am}(t)$ of the aircraft corresponding to an air speed strategy with permanently a minimum engine thrust, and then adjust parameters of the said adjustable modelled profile so that the adjusted modelled profile obtained of altitude h(t) and of air speed Va(t) of the aircraft ensures the consumption of the variation of energy of the aircraft in the air $\Delta E_a$ within the required timespan $\Delta t_{required}$, and the required altitude variation $h_i$–$h_f$ in the required time with permanently a minimum engine thrust; and then in a third step, determine a geodesic trajectory of the aircraft and a lateral geodesic trajectory on the basis of a type of lateral manoeuvre, of the adjusted altitude profile h(t), of the adjusted air speed profile va(t) and of the knowledge of the speeds of the winds in the aircraft's scheduled geographical traversal zone.

According to particular embodiments, the system for determining descent and rejoining under minimum thrust of a target point comprises one or more of the following characteristics:

the at least one electronic computer for determining a computation of a minimum-thrust descent and rejoining profile is an electronic computer integrated into a flight management system FMS, or an EFB or any embedded computer for aiding navigation but not integrated into the avionics of the aircraft, or a computer integrated into an air traffic control ground station, as decision aid for a controller, or a computer integrated into a drone's mission management ground station;

according to a first configuration, the aircraft comprises a first computer, configured to compute on-board a required intermediate descent speed CAS and a required flight distance, and first transmission means for dispatching these two prerequisite parameters, and the air traffic control station comprises second transmission means for receiving the required intermediate descent speed CAS and the required flight distance and dispatching to the aircraft setpoints for defining a lateral trajectory and a speed, the said setpoints being determined by a second computer of the ground station so as to ensure the flight distance and the intermediate speed required, or according to a second configuration, the ground station is configured to dispatch to the aircraft as a supplement to the required timespan, a point of convergence along the flight plan, and the first computer of the aircraft is configured to determine the required intermediate speed CAS and the required geodesic distance, and to identify a turning point, either along a holding of current heading by a trajectory alignment, or along the current flight plan, by trajectory shortening, followed by direct flight towards the convergence point.

BRIEF DESCRIPTION OF THE DRAWINGS

The invention will be better understood on reading the following description of several embodiments which is given solely by way of example and while referring to the drawings in which.

DETAILED DESCRIPTION

Figure 1:
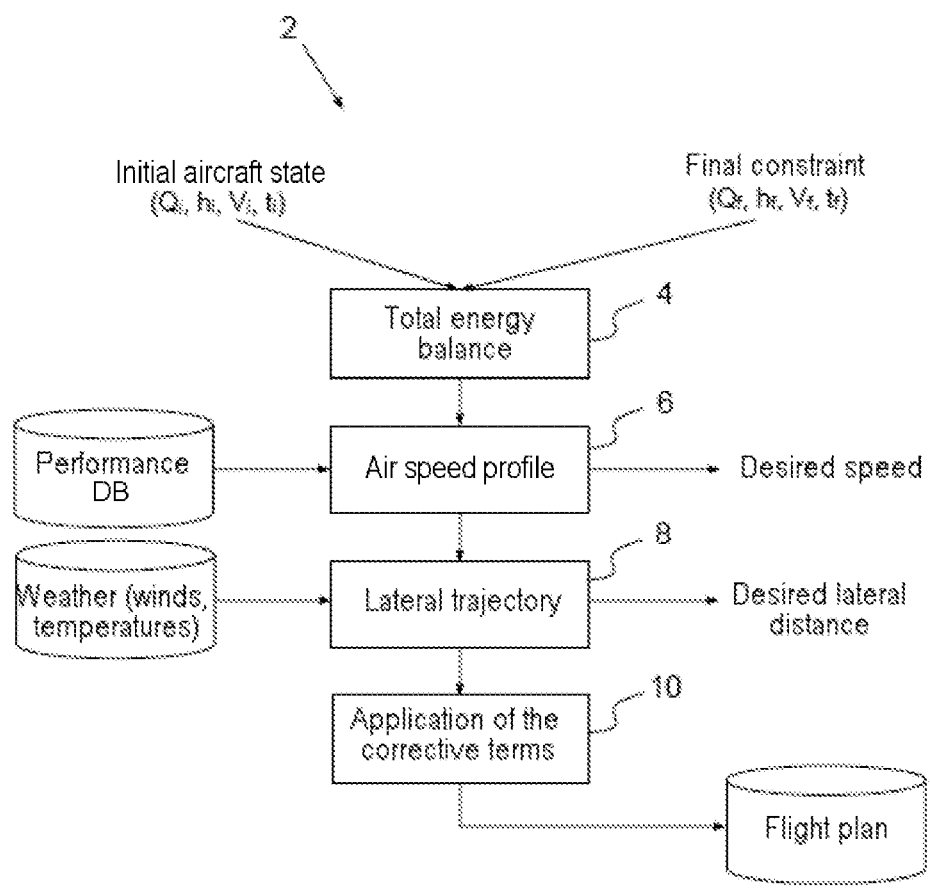
FIG. 1 is a flowchart of a method according to the invention for determining a minimum-thrust descent and rejoining profile in respect of a target point by an aircraft.

The method according to the invention consists, in the course of descent of the aircraft, in determining the descent speed $V_a(t)$ and the horizontal or lateral distance D making it possible to reach a descent and rejoining point of an arrival target point with a specified timespan or specified arrival time.

The required time constraint or required temporal timespan are typically determined by a ground operator, who transmits this constraint to the crew of the aircraft. In particular cases of mission, the temporal constraint may be determined on-board, without any need for a ground-to-air link.

Likewise, the method can typically be implemented on-board, but it is possible to envisage performing such processing on the ground, either for the air traffic controller, or for the ground operator of a pilotless vehicle.

In principle, the method according to the invention consists in evaluating or computing at each current instant the specific excess power SEP making it possible to ensure the desired energy reduction within a required timespan, between the current altitude and the speed of the aircraft, and the required altitude and the required speed at a reference or target point, specified along the descent profile according to the organization of the approach procedures and the traffic management. According to the conventional terminology, this may entail for example a reference point of "Initial Approach Fix" type, a reference point of "Final Approach Fix" type, or a reference point of "Metering Fix" type determined over the flight plan. This computation can take into account the values of specific excess power SEP at the current altitude, at the destination target altitude, as well as the variations of SEP between the current speed and a desired descent speed, and then between the desired descent speed and the required speed at the arrival or reference target point. This computation makes it possible to identify a profile of desired descent air speed Va(t) and of desired altitude h(t) making it possible to consume the energy disparity within the required timespan. It is then possible to deduce therefrom firstly a flight distance with respect to the air mass, and then by integrating the component of the winds a ground or geodesic distance, which make it possible to ensure the required energy reduction within the required time while remaining under minimum engine thrust.

The desired profile of air speed Va(t) and of altitude h(t), as well as the desired lateral geodesic flight distance constitute information which makes it possible to fully determine a lateral manoeuvre and an air speed profile meeting the descent and temporal constraint prerequisites, which are fixed either by the air traffic control, or on-board the aircraft. It should be noted that the data of desired lateral geodesic flight distance, and/or of characteristic speed setpoint(s) of the desired air speed profile, can also be used in ground-to-air communications so as to allow an air traffic control operation in accordance with the operational need and with the economic efficiency of the flight. These exchanges can be envisaged by data link, or by voice radiocommunication, and be processed automatically on-board or input manually on-board the aircraft so as to adjust the trajectory of the aircraft accordingly.

According to FIG. 1, a method 2 for determining a minimum-thrust descent and rejoining profile in respect of a target point by an aircraft, comprises at least first, second, third steps 4, 6, 8, executed successively, and optionally comprises a fourth step 10, executed after the third step 8.

The descent profile of the aircraft, while permanently under minimum engine thrust, is defined from a first initial state of the aircraft up to a second final state of the aircraft temporally constrained.

The first initial state of the aircraft comprises a first geodesic position Qi of departure, an initial time $t_i$, a first initial altitude hi, a first initial speed of the aircraft $\vec{Vi}$ relative to the ground, that is to say geodesic, and a first wind speed $\vec{Wi}$.

The second final state of the aircraft comprises a second geodesic position Qf of arrival at the target point, a final constraint time $t_f$ of arrival at the target point, a second final altitude hf, a second final speed of the aircraft $\vec{Vf}$ relative to the ground, that is to say geodesic, and a second wind speed $\vec{Wf}$.

The final altitude hf and the second final speed of the aircraft $\vec{Vf}$ relative to the ground at the instant and at the position that are constrained by the arrival target point is determined once the time constraint has been identified, either on the basis of the known constraints of the approach procedure, or on the basis of the aircraft's initially planned descent and approach profile.

Thus are defined a required timespan $\Delta t_{required}$, equal to the difference $t_f - t_i$ between the final constraint time $t_f$ and the initial time $t_i$, and an altitude variation $\Delta h_{required}$, equal to the difference $h_f - h_i$ between the second final altitude hf and the first initial altitude hi.

The first step 4 is a step of computing an energy differential of the aircraft in the air, denoted $\Delta E_a$, between the first initial state of the aircraft and the second final state of the aircraft.

The second step 6, subsequent to the first step 4, is a step in which an adjustable modelled profile of altitude $h_m(t)$ and of air speed $Va_m(t)$ of the aircraft is firstly provided. The adjustable modelled profile of altitude $h_m(t)$ and of air speed $Va_m(t)$ of the aircraft, or adjustable descent profile model, corresponds to a predetermined air speed strategy of the aircraft while permanently under minimum engine thrust, and uses one or more adjustable parameters. Next, in the course of the same second step 6, the parameters of the adjustable modelled profile of altitude $h_m(t)$ and of air speed $Va_m(t)$ of the aircraft are adjusted so that the adjusted modelled profile obtained of altitude h(t) and of air speed Va(t) of the aircraft ensures the consumption of the required variation of energy of the aircraft in the air $\Delta E_a$ within the required timespan $\Delta t_{required}$, and the required altitude variation $\Delta h_{required}$ within the required timespan $t_{required}$ with permanently a minimum engine thrust.

The third step 8, subsequent to the second step 6, is a step of determining a lateral geodesic trajectory of the aircraft, carried out on the basis of the adjusted altitude profile h(t), of the adjusted air speed profile Va(t) and of the knowledge of the speeds of the winds in the aircraft's scheduled geographical traversal zone. The third step 8 is carried out by firstly computing a desired lateral flight distance with respect to the air mass, and then a desired lateral geodesic or ground distance which integrates the component of the winds, thereby making it possible to ensure the required energy reduction within the required time while remaining under minimum engine thrust.

Thus the determining method 2 determines a combination of lateral distance modification and of descent speed adjustment, making it possible to lose or to gain time with respect to the required temporal timespan, while remaining in a mode of minimum engine thrust. The benefit of the determining method 2 resides in efficient and simple management of the compromise between speed adjustment and adjustment of the lateral component of the geodesic trajectory so as to remain energy-efficient.

Indeed, a loss of time can be ensured either by lengthening the trajectory, thereby requiring supplemental energy, or by reducing speed, thereby requiring more trajectory to reduce the energy. It can therefore be applied through a combination of coherent lengthening of the lateral trajectory and coherent speed reduction which are compatible with maintaining the minimum thrust.

Likewise, a gain of time can be ensured either through a trajectory shortening, with risk of surplus-energy, or through a speed increase which raises the drag and therefore makes it possible to reduce the energy over a shorter distance. It is therefore possible to find a combination of trajectory shortening and speed increase allowing the required gain of time while maintaining the minimum thrust.

The method 2 for determining a minimum-thrust descent and rejoining profile in respect of a target point according to the invention therefore makes it possible to compute efficiently and simply a manoeuvre of descent and rejoining under minimum engine thrust of a target point, and/or to exchange certain characteristic parameters between air traffic controller and crew, in such a way as to satisfy during the descent of the aircraft, a final time, prescribed in a static or dynamic manner and provided by an external command, of arrival of the aircraft at the target point, while remaining in an engine regime with constant and minimum thrust without resorting to the airbrakes, therefore without additional fuel consumption of the aircraft, or surplus-energy prejudicial to the stabilization of the aircraft.

Figure 2:
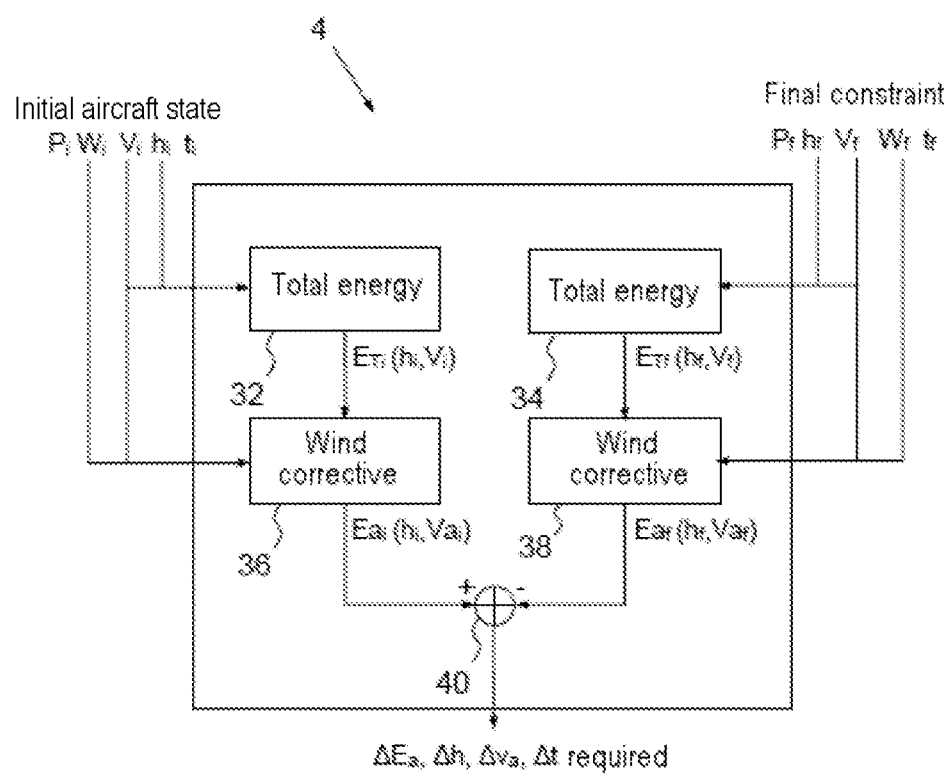
FIG. 2 is a detailed flowchart of the first step of the method according to the invention of FIG. 1 in the course of which is computed the energy differential of the aircraft in the air between the first initial departure state and the second final arrival state at the target point.

According to FIG. 2, the first step 4 consists in determining the differential of the energy of the aircraft in the air $\Delta E_a$ as the difference Eaf−Eai between the energy of the aircraft in the air in the final state Eaf and the energy of the aircraft in the air in the initial state Eai.

The energy of the aircraft in the air $E_{ai}$ in the initial state is equal to the sum $E_{Ti}+E_{Wi}$ of the total energy $E_{Ti}$ of the aircraft in the initial state and of a first corrective term $E_{Wi}$ for the effect of the winds in the initial state on the air slope followed by the aircraft.

The energy of the aircraft in the air $E_{af}$ in the final state is equal to the sum $E_{Tf}+E_{Wf}$ of the total energy $E_{Tf}$ of the aircraft in the final state and of a second corrective term $E_{Wf}$ for the effect of the winds in the final state on the air slope followed by the aircraft.

The first step 4 comprises first, second, third, fourth and fifth sub-steps 32, 34, 36, 38, 40.

In the first sub-step 32, the total energy $E_{Ti}$ of the aircraft in the initial state is computed on the basis of the first initial speed of the aircraft $\vec{V_i}$ relative to the ground, of the first initial altitude hi and of the mass $m(t_i)$ of the aircraft at the initial instant ti according to the equation:

$$E_{Ti} = \frac{1}{2}m(t_i)V_i^2 + m(t_i) \cdot g \cdot h_i$$

g denoting the acceleration due to terrestrial gravity.

In the second sub-step 34, the total energy $E_{Tf}$ of the aircraft in the final state is computed on the basis of the second final speed of the aircraft $\vec{Vf}$ relative to the ground, of the second final altitude hf and of the mass $m(t_f)$ of the aircraft at the final instant $t_f$ according to the equation:

$$E_{Tf} = \frac{1}{2}m(t_f) \cdot V_f^2 + m(t_f)g \cdot h_f$$

In the third sub-step 36, executed after the first sub-step 32, the first corrective term $E_{Wi}$ for the effect of the winds in the initial state on the air slope followed by the aircraft is computed according to the equation:

$$E_{Wi} = -\frac{1}{2}m(t_i)W_i^2 - m(t_i)\overrightarrow{(V_i - W_i)} \cdot \vec{W_i}$$

in which $\vec{W_i}$ denotes the first wind speed observed at the first initial position of the aircraft.

Next, in the same third sub-step 36, the first corrective term $E_{Wi}$ is added to the total energy $E_{Ti}$ of the aircraft in the initial state to obtain the energy of the aircraft in the air Eai in the initial state.

In the fourth sub-step 38, executed after the second sub-step 34, the second corrective term $E_{Wf}$ for the effect of the winds in the initial state on the air slope followed by the aircraft is computed according to the equation:

$$E_{Wf} = -\frac{1}{2}m(t_f)W_f^2 - m(t_f)\overrightarrow{(V_f - W_f)} \cdot \vec{W_f}$$

in which $\vec{W_f}$ denotes the second wind speed observed at the second final position of the aircraft.

Next, in the same fourth sub-step 38, the second corrective term $E_{Wf}$ is added to the total energy $E_{Tf}$ of the aircraft in the final state to obtain the energy of the aircraft in the air Eaf in the initial state.

In the fifth sub-step step 40, the difference $E_{af}-E_{ai}$ between the energy of the aircraft in the air in the final state $E_{af}$ and the energy of the aircraft in the air in the initial state $E_{ai}$ is computed.

It should be noted that generally, knowing the current parameters of the state vector of the aircraft, at a current instant the current total energy of the aircraft $E_T(t)$ is the sum of the kinetic energy and of the potential energy according to the equation:

$$E_T(t) = \frac{1}{2}m(t)V_g^2(t) + m(t) \cdot g \cdot h(t)$$

Where $\vec{V_g}(t)$ denotes the inertial speed, with respect to the ground, m(t) denotes the mass of the aircraft, g denotes the acceleration due to terrestrial gravity, and h(t) denotes the current altitude of the aircraft.

The ground inertial speed $\vec{V_g}(t)$ is correlated with the air speed Va(t) of the aircraft by using the direction and the speed of the wind $\vec{W}(t)$.

If the current total energy is differentiated, we obtain the equation:

$$\frac{dE_T}{dt} = m\vec{V}_g \frac{d\vec{V}_g}{dt} + mg\frac{dh}{dt}$$

By decomposing the inertial speed $\vec{V_g}(t)$ with respect to the ground into a speed component $\vec{V_a}(t)$ with respect to the air mass and the speed $\vec{W}(t)$ of the air mass, that is to say the wind, we obtain the equation:

$$\frac{dE_T}{dt} = m\vec{M}\frac{d\vec{W}}{dt} + m\frac{d(\vec{W} \cdot \vec{V}_a)}{dt} + m\vec{V}_a\frac{d\vec{V}_a}{dt} + mg\frac{dh}{dt} \quad \text{(equation \#1)}$$

It is then possible to identify in this equation a specific excess power SEP (Specific Excess Power) term defined by equation #2, $$SEP = \frac{\vec{V}_a}{g}\frac{d\vec{V}_a}{dt} + \frac{dh}{dt},$$

and two corrective terms related to the wind.

Integration of equation #1 between any two instants t1 and t2 makes it possible to refer the total energy difference to the integration of the specific excess power of the aircraft in the absence of wind, to which two corrective wind terms are added.

The integrated equation may be written:

$$\frac{E_{T2} - E_{T1}}{mg} = \int_{t_1}^{t_2} SEP(t)\,dt + \frac{1}{2g}\left(W_2^2 - W_1^2 + 2\vec{V}_{a2} \cdot \vec{W}_2 - 2\vec{V}_{a1} \cdot \vec{W}_1\right) \quad \text{(Equation \#3)}$$

Thus, knowing the initial energy of the aircraft, as well as the current wind and the predicted wind at the arrival point, one knows how to determine what energy disparity the integration of the SEP in the air between the initial and final instants should produce, this SEP in the air being computed without taking the wind into account.

It should be noted that the wind terms in the formula of equation #3 merely convey the addition of the wind and of the air speed to form the ground speed, but do not account for the effect of the wind on the ground distance travelled. This effect of the wind will be able to be taken into account in the fourth step 10 of the method 2.

The excess power is also determined by the balance between the engine thrust T and the drag D according to the expression:

$$SEP(t) = V_a(t)\frac{T-D}{m(t)g} \quad \text{(Equation #4)}$$

The thrust T depends on the engine regime and the altitude while the drag depends on the altitude, the air speed and the air slope which together determine the angle of incidence of the descent.

It should be noted that the two wind terms in the formula of equation #3 merely convey the addition of the wind and of the air speed to form the ground speed.

On the other hand, equation #4 expressed in the air mass compels the introduction of a term related to the wind gradient, or more exactly, its application makes it necessary to introduce a term related to the wind gradient into equation #2 expressing the SEP. The expression for the SEP then becomes:

$$SEP(t) = \frac{\vec{V}_a}{g}\frac{d\vec{V}_a}{dt} + \frac{dh}{dt} + \frac{\vec{V}_a}{g}\frac{d\vec{W}}{dt} \quad \text{(Equation #5)}$$

Likewise, equation #4 which rests upon a balance between lift and weight must be corrected by the apparent weight induced by an additional load factor when the aircraft is in the process of turning.

The effect of the wind gradients and of the apparent speed due to the turning manoeuvres related to the lateral trajectory, is ignored in the first step 4 but will be able to be reintroduced in a second step described hereinafter.

Knowing the first initial altitude, the first initial air speed, the second final altitude and the second final air speed, it is possible to determine, in a general manner a profile in terms of altitude h(t) and air descent speed $V_a(t)$ corresponding to a particular descent strategy, for which the integral of the SEP, taking into account suitably adapted acceleration or deceleration phases, makes it possible to obtain the energy differential within the required timespan. Generally, this descent strategy can be defined by a descent profile, parameterized with the aid of a set of parameters forming degrees of freedom of the descent profile, so as to make it possible, by adjusting these parameters, to obtain the energy differential within the required timespan, according to the numerical optimization schemes known from the state of the art.

For example, when we are in the constant and minimum engine regime (known as the "idle" regime), for descent phases with constant speed or under constant acceleration or under constant deceleration, we can make the approximation that the variation of SEP over any time interval [t1, t2], t1 being strictly lower than t2, on which the phase is defined, is linear, and we then obtain the relation:

$$\frac{SEP_1 + SEP_2}{2}(t_2 - t_1) = (h_2 - h_1) + \frac{V_{a2}^2 - V_{a1}^2}{2g} \quad \text{(Equation #6)}$$

Three elementary cases can then arise:
a first case of a descent with bounded constant acceleration,
a second case of descent with constant CAS speed or optionally with constant Mach number;
a third case of descent with deceleration with constant energy ratio.

Figure 3:
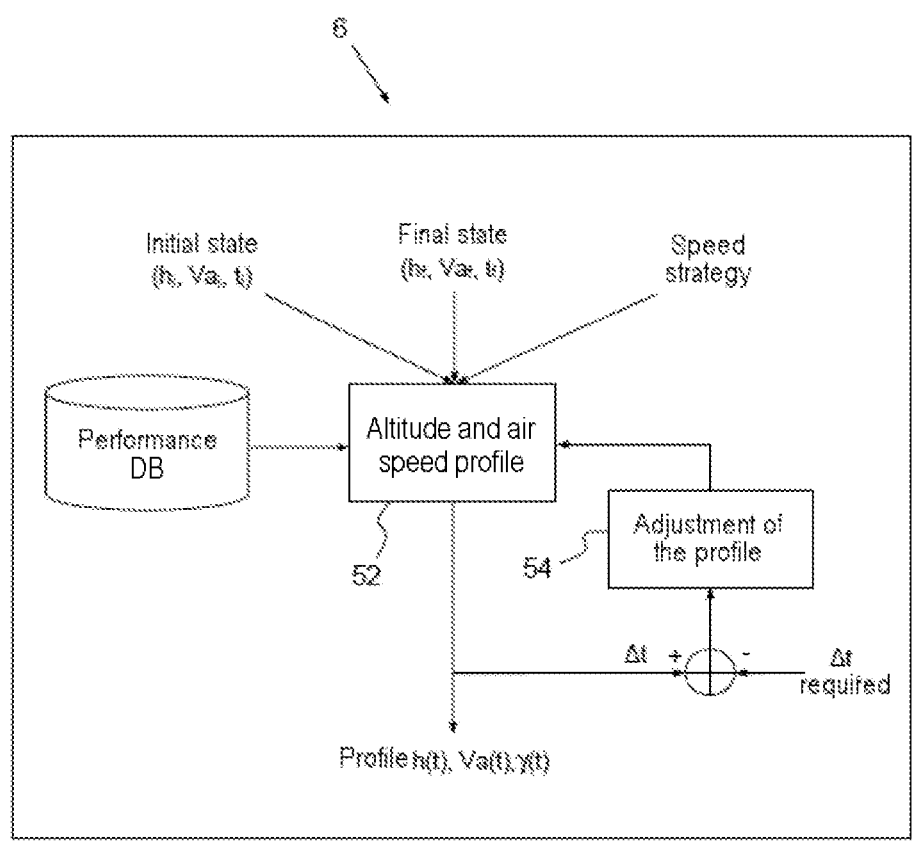
FIG. 3 is a detailed flowchart of the second step of the method according to the invention of FIG. 1 in the course of which are adjusted the parameters of a modelled profile of altitude and of air speed of the aircraft, corresponding to an air speed strategy of the aircraft while permanently under minimum engine thrust.

According to FIG. 3, the second step 6, subsequent to the first step 4, comprises a first sub-step 52 and a second sub-step 54.

The first sub-step 52 is a step of providing an adjustable modelled profile of altitude $h_m(t)$ and of air speed $Va_m(t)$ of the aircraft.

In the course of the second sub-step 54, the parameters of the adjustable modelled profile of altitude $h_m(t)$ and of air speed $Va_m(t)$ of the aircraft are adjusted so that the adjusted modelled profile obtained of altitude h(t) and of air speed va(t) of the aircraft ensures the consumption of the required variation of energy of the aircraft in the air $\Delta E_a$ within the required timespan $\Delta t_{required}$, and the required altitude variation hf-hi within the required timespan with permanently an engine regime with constant and minimum thrust.

The adjustable modelled profile of altitude $h_m(t)$ and of air speed $Va_m(t)$ of the aircraft is decomposed into or formed by a temporal succession of a number K, greater than or equal to 2, of adjustable elementary profiles of altitude $h_m(k,t)$ and of air speed $Va_m(k,t)$ of the aircraft, the index k being an identification index identifying the order of temporal succession of the adjustable elementary profiles $h_m(k, t)$, $Va_m(k,t)$ lying between 1 and K.

The elementary profile $h_m(1, t)$ and $Va_m(1, t)$ evolves over a first elementary time interval IT(1) lying between the initial time ti and a first intermediate time t(2) forming respectively the times associated with the first initial state and with a first intermediate state of the aircraft.

For k varying between 2 and N−1, the elementary profile $h_m(k, t)$ and $Va_m(k, t)$ evolves over a k-th elementary time interval IT(k) lying between a (k−1)-th intermediate time t(k) and a k-th intermediate time t(k+1) forming respectively the times associated with the (k−1)-th intermediate state and with the k-th intermediate state of the aircraft.

The elementary profile $h_m(N, t)$ and $Va_m(N, t)$ evolves over an N-th elementary time interval IT(N) lying between the (N−1)-th intermediate time t(N) and the final time tf forming respectively the times associated with the (N−1)-th intermediate state and with the second final state of the aircraft.

Two consecutive intervals IT(k), IT(k+1) for k varying from 1 to N−1 are contiguous.

The adjustable profiles $h_m(k, t)$ and $Va_m(k,t)$, for k varying from 1 to N correspond to phases $\Phi(k)$ of descent under constant and minimum engine regime, the phases of descent under constant and minimum engine regime included in the set formed by the descent phases with constant speed CAS, the constant-acceleration phases and the deceleration phases with constant energy ratio ER.

For each descent phase $\Phi(k)$ and the corresponding adjustable profile $h_m(k, t)$ and $Va_m(k,t)$, k varying from 1 to N, the variation of the excess power in the air $SEP_m(k, t)$ along the elementary interval IT(k) is linear, the excess power in the air being defined by the equation:

$$SEP_m(k, t) = \frac{\overrightarrow{V_{am}(k, t)}}{g} \cdot \frac{\overrightarrow{dV_{am}(k, t)}}{dt} + \frac{dh_m(k, t)}{dt}$$

where g denotes the acceleration due to gravity in the vicinity of the surface of the Earth.

For k varying from 1 to N, the integral of the excess power $SEP_m(k, t)$ along the elementary interval $IT(k)$ is equal to the energy differential of the aircraft in the air $\Delta E_{am}(k)$ over the k-th interval $IT(k)$ between the state of the aircraft at the instant $t(k)$ and the state of the aircraft at the instant $t(k+1)$, divided by the weight of the aircraft as product of the mass of the aircraft and of the constant according to the relations:

$$\int_{t(k)}^{t(k+1)} SEP_m(k, t)\, dt = \frac{E_{am}(k, t(k+1)) - E_{am}(k, t(k))}{m \cdot g} = \frac{SEP_m(k, t(k)) + SEP_m(k, t(k+1))}{2}$$

For each descent phase $\Phi(k)$ and the corresponding adjustable profile $h_m(k, t)$ and $Va_m(k,t)$, k varying from 1 to N, the start instant of the interval $IT(k)$, $t(k)$, the end instant of the interval $IT(k)$, $t(k+1)$, the altitudes $h_m(t(k))$, and $h_m(t(k+1))$, the air speeds of the aircraft $Va_m(k, t(k))$ and $Va_m((k,t(k+1))$, the excess powers $SEP_m(k, t(k))$, $SEP_m(k, t(k+1))$, corresponding respectively to the two instants $t(k)$ and $t(k+1)$ are linked by the relation:

$$\frac{SEP_m(k, t(k)) - SEP_m(k, t(k+1))}{2} \cdot (t(k+1) - t(k)) = [h_m(t(k+1)) - h_m(t(k))] + \frac{Vam^2(k, t(k+1)) - Vam^2(k, t(k))}{2g}$$

For k varying from 1 to N, when the adjustable profiles $h_m(k, t)$ and $Va_m(k,t)$ correspond to a phase $\phi(k)$ of descent with bounded constant acceleration and under constant and minimum engine regime, the duration $\Delta t_m(k)$ of the k-th elementary interval $IT(t)$ and the altitude variation $\Delta h_m(k)$ over the said interval $IT(k)$ satisfy the equations:

$$\Delta t_m(k) = \frac{V_{am}(k, t(k+1)) - V_{am}(k, t(k))}{A} \text{ and}$$

$$\Delta h_m(k) = \left(\frac{SEP_m(k, t(k)) + SEP_m(k, t(k+1))}{2A} - \frac{V_{am}(t(k)) + V_{am}(t(k+1))}{2g}\right) \cdot (V_{am}(t(k+1)) - V_{am}(t(k)))$$

For k varying from 1 to N, when the adjustable profiles $h_m(k, t)$ and $Va_m(k,t)$ correspond to a phase $\phi(k)$ of descent with constant CAS speed or Mach number and under constant and minimum engine regime, the duration $\Delta t_m(k)$ of the k-th elementary interval $IT(t)$ and the altitude variation $\Delta h_m(k)$ over the said interval $IT(k)$ satisfy the equations $$\Delta h_m(k) = h_m(k, t(k+1)) - h_m(k, t(k)) \text{ and}$$

$$\Delta t_m(k) = \frac{2}{SEP_m(k, t(k)) + SEP_m(k, t(k+1))} \cdot \left(\Delta h_m(k) + \frac{Vam^2(t(k+1)) - Vam^2(t(k))}{2g}\right)$$

For k varying from 1 to N, when the adjustable profiles $h_m(k, t)$ and $Va_m(k,t)$ correspond to a phase $\Phi(k)$ of descent under deceleration with constant energy ratio ER and under constant and minimum engine regime, the duration $\Delta t_m(k)$ of the k-th elementary interval $IT(t)$ and the altitude variation $\Delta h_m(k)$ over the said interval $IT(k)$ satisfy the equations:

$$\Delta t_m(k) = \frac{2}{ER \cdot (SEP_m(k, t(k)) + SEP_m(k, t(k+1)))} \cdot \left(\frac{Vam^2(t(k+1)) - Vam^2(t(k))}{2g}\right)$$

and $$\Delta h_m(k) = \frac{(1 - ER)}{ER} \cdot \frac{(Vam^2(t(k+1)) - Vam^2(t(k)))}{2g}$$

The parameters of the adjustable profiles $h_m(k, t)$ and $Va_m(k,t)$ are adjusted so that the sum of the durations of intervals $\Delta t_m(k)$ for k varying from 1 to N is equal to the required duration $\Delta t_{required}$, and the sum of the altitude variations $\Delta h_m(k)$ for k varying from 1 to N is equal to the difference between the first initial altitude hi and the second final altitude hf.

It should be noted that optionally, depending on the SEP and the energy ratio, the deceleration with constant energy ratio may be bounded by passenger comfort criteria, in a similar manner to the case of the bounded constant acceleration.

Figure 4:
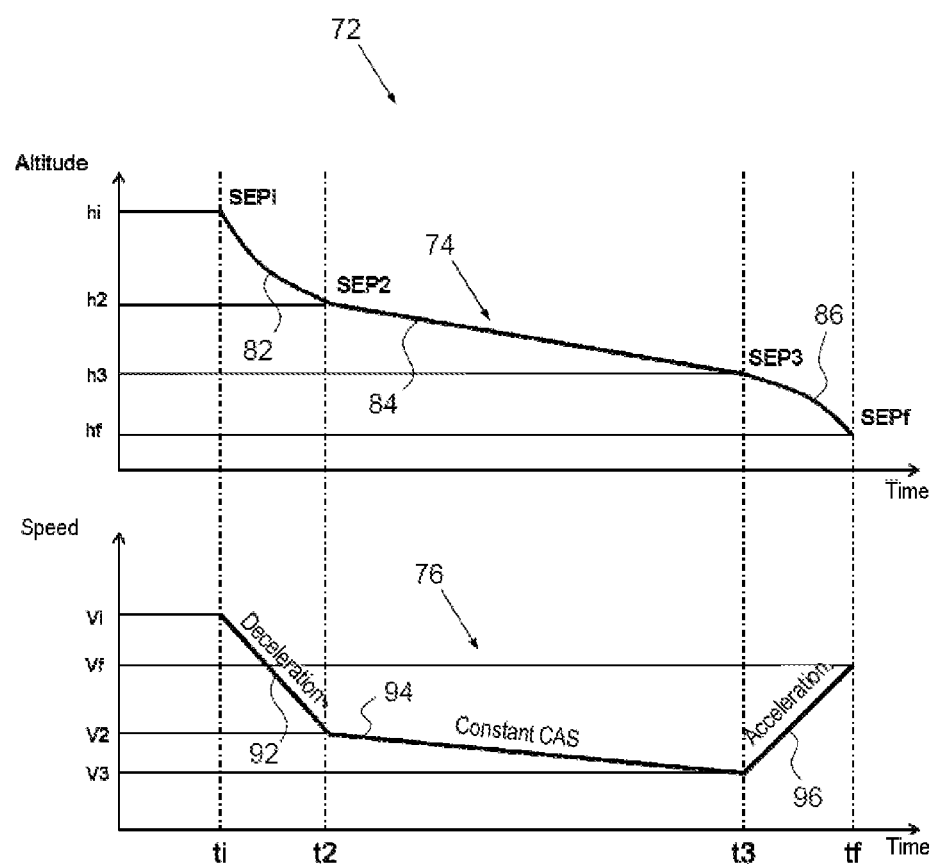
FIG. 4 is a view of an example of a modelled profile of altitude and of air speed of the aircraft, corresponding to an air speed strategy of the aircraft while permanently under minimum engine thrust, usable in the second step of FIG. 3 and comprising three elementary phases with an intermediate phase at constant intermediate descent calibrated air speed CAS.

According to FIG. 4 and a first example of a preferred descent strategy, an adjusted modelled profile of altitude 72 h(t) (curve 74) and of air speed Va(t) (curve 76) is illustrated as being the altitude and air speed profile obtained after adjusting the parameters of an adjustable modelled profile of altitude $h_m(t)$ and $Va_m(t)$, associated with the descent strategy.

The descent strategy selected here to determine the adjusted profile here typically comprises three successive phases:

a first phase $\Phi(1)$ of acceleration/deceleration to a desired speed CAS, and then a second phase $\Phi(2)$ with the constant desired speed CAS (Calibrated Air Speed), and then a third phase $\Phi(3)$ of acceleration/deceleration to the final speed.

These three phases $\Phi(1)$, $\Phi(2)$, $\Phi(3)$ are illustrated by a first series of three sections 82, 84, 86 on the curve 74 of the altitude profile h(t) and a second series 92, 94, 96 on the curve of the air speed profile Va(t).

The desired constant speed CAS, and the durations of the three phases are adjusted so as to satisfy the constraint of required total duration as well as the duration of the altitude variation constraint hi-hf. These quantities form the set of parameters to be adjusted in the adjustable modelled profile of altitude $h_m(t)$ and $Va_m(t)$, associated with the descent strategy.

The value of SEP as well as the value of air speed associated with a given speed CAS, being dependent on the altitude, it is possible to adjust the values of SEP and of air speed once the altitude variation is known. However the variations are small and this adjustment is generally unnecessary, depending on the desired precision.

The formulae described hereinabove, applied for N equal to 3, make it possible, for a fixed desired setpoint speed CAS, to determine the altitude variations necessary for the acceleration and deceleration phases, as well as the variation in altitude flown with constant CAS. A speed profile making it possible to pass from the initial total energy (altitude and speed) to the final total energy is then obtained, together with the timespan required to perform each of the phases of acceleration, deceleration, and descent with constant CAS speed. This computation can be repeated in an iterative manner for various values of desired speed CAS, so as to find the setpoint speed that achieves the desired timespan, according to Newton's algorithm or the chord algorithm.

The initial value of CAS may optionally be determined by using flight time profiles with minimum and maximum speed, according to the speed search method described in patent application U.S. Pat. No. 8,332,145. It should be noted that an iteration will still be necessary in order to satisfactorily adjust the altitude variation and the acceleration and deceleration phases.

As variant of this first example, it is also possible to vary the instant of deceleration between the current speed CAS and the final speed CAS.

According to a second exemplary descent strategy, an adjusted modelled profile of altitude h(t) and of air speed Va(t) is obtained after adjusting the parameters of an adjustable modelled profile of altitude $h_m(t)$ and of air speed $Va_m(t)$, associated with this descent strategy of a second type.

The descent strategy selected in this second example to determine the adjusted profile here typically comprises three successive phases:

a first phase $\Phi(1)$ with the initial speed CAS on a first altitude slice $\Delta h_m(1)$ with an adjustable duration making it possible to vary a deceleration start instant, and then a second phase $\Phi(2)$, of deceleration from the initial speed CAS to the final speed CAS, and then a third phase $\Phi(3)$ of descent with the final speed CAS until the final altitude.

The altitude variation $\Delta h_m(1)$ before the deceleration is adjusted iteratively to obtain the duration of the first phase.

Thus on termination of the second step 6, a temporal profile of air speed Va(t) is available which has the property of ensuring the required altitude variation within the required timespan, while maintaining a minimum thrust.

This speed profile Va(t) also determines the altitude profile h(t) by virtue of the relation which links altitude variations and time variation.

Finally, the air slope $\gamma(t)$ which is dependent on h(t) and Va(t) according to the relation sin $$\gamma(t) = \frac{\frac{dh}{dt}}{V_a}(t)$$

makes it possible to obtain a curve of distance travelled Da in the air mass.

Once the speed profile Va(t) and the flight duration are known, a horizontal air distance travelled Da is obtained. It is then necessary to take into account the aggregated effect of the wind W to determine the horizontal or lateral ground distance Dg.

By considering Qi and Qf the geodesic initial and final positions of the aircraft, the vector is defined by the relation:

$$\overrightarrow{Q_iQ_f} = \int_{ti}^{tf} \overrightarrow{V_g} \cdot dt = \int_{ti}^{tf} \overrightarrow{V_a} dt + \int_{ti}^{tf} \overrightarrow{W} dt$$

If this equation is reduced to its horizontal component, we obtain:

$$\overrightarrow{P_iP_f} = \int_{ti}^{tf} \overrightarrow{V_{a,hor}} + \int_{t1}^{t2} \overrightarrow{W_{hor}} \cdot dt \qquad \text{(Equation \#7)}$$

$P_i$ and $P_f$ denoting the initial departure and final arrival geodesic horizontal positions determined on the basis of initial and final geodesic positions Qi and Qf, $\overrightarrow{V_{a,hor}}$ denoting the horizontal component of the air speed, and $\overrightarrow{W_{hor}}$ the horizontal component of the wind.

The horizontal air speed $V_{a,hor}$ has the same heading as the air speed $V_a$, and a modulus multiplied by the cosine of the air slope $\gamma(t)$, and the wind W is reduced to its horizontal component $W_h$.

Figure 5:
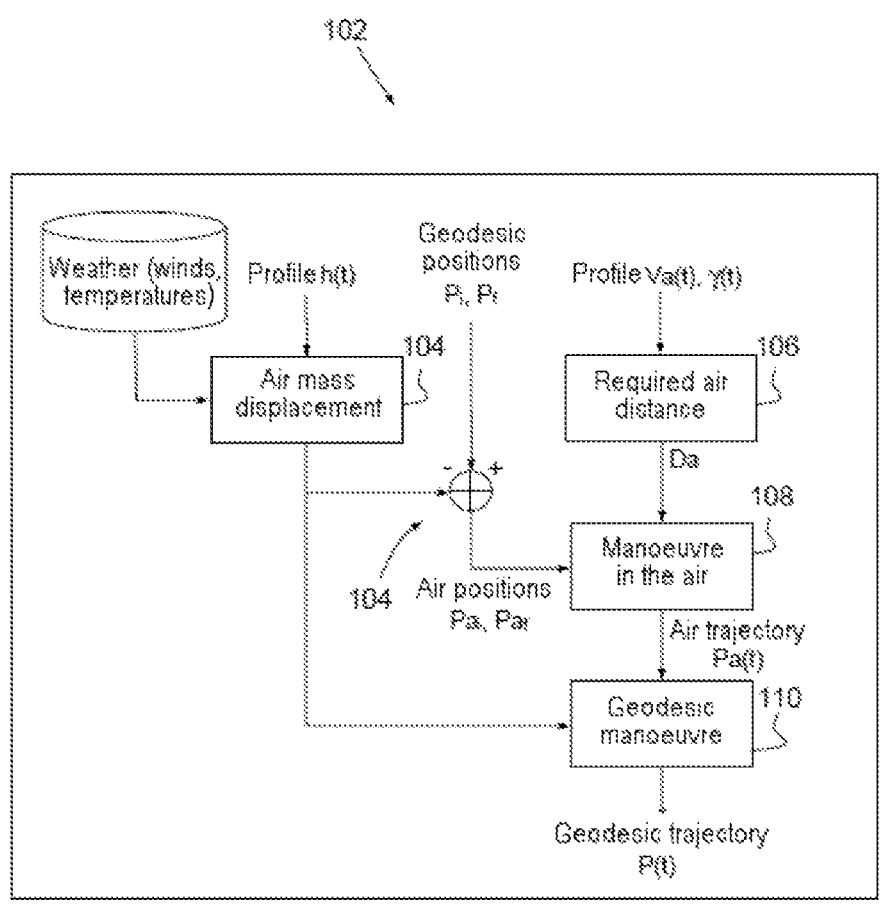
FIG. 5 is a detailed flowchart of a first embodiment of the third step of the method according to the invention of FIG. 1, in which a lateral manoeuvre is determined before deducing therefrom the geodesic trajectory.

According to FIG. 5 and a first embodiment 102 of the third step 8, it is assumed at least as a first approximation that in the considered geographical zone of displacement of the aircraft, the speed and the direction of the wind depend only on the altitude. It is then possible to evaluate the second term of equation #7 independently by virtue of knowing the altitude profile h(t).

According to FIG. 5 the third step 102 comprises a first sub-step 104, a second sub-step 106, a third sub-step 108, and a fourth step 110, executed successively.

In the course of the first sub-step 104, departure and arrival horizontal positions, Pa1 and Pa2, within the mass are determined on the basis of departure and arrival horizontal geodesic positions, $P_i$ and $P_f$, and of the horizontal speed of the wind $\overrightarrow{W_{hor}}(h)$ by assuming that the speed and the direction of the wind depend only on the altitude h and by using the relation:

$$\overrightarrow{P_{a1}P_{af}} = \overrightarrow{P_iP_f} - \int_{t1}^{t2} \overrightarrow{W_{hor}}(h(t))dt \qquad \text{Equation \#8}$$

It should be noted that the first sub-step can be implemented for any segment P1P2 of the horizontal geodesic or ground trajectory P(t), for which the altitude and the transit time at one of the ends P1 or P2 is known.

In the course of the third sub-step 108, a required lateral distance to be travelled $D_a$ is determined on the basis of the air speed profile of the aircraft Va(t) and of the air slope $\gamma(t)$ by using the equation:

$$D_a = \int_{t1}^{t2} V_a(t) \cdot \cos(\gamma(t)) dt$$

In the course of the same second sub-step 106, a lateral trajectory Pa(t) in the air is determined joining the departure and arrival horizontal positions, $P_{ai}$ and $P_{af}$, and taking into account the vectors of initial and final air speed, the length of the lateral trajectory in the air Pa(t) being constrained by being set equal to the required lateral distance to be travelled $D_a$.

The computation executed in the second sub-step can employ principles defined in several methods for inter-aircraft lateral spacing manoeuvres such as described in patent applications FR2983619 or U.S. Pat. No. 8,862,373 and FR2926156 or U.S. Pat. No. 8,078,341.

It is also possible to apply geometries that are very varied according to the phases of the descent, and the manoeuvres envisaged for adjusting the trajectory laterally, so as to travel the required distance in the air mass.

In the course of the fourth sub-step 110, a geodesic lateral trajectory P(t) is determined joining the departure and arrival horizontal positions, Pa1 and Pa2 and taking into account the vectors of initial and final air speed, the length of the geodesic lateral trajectory P(t) being constrained by being set equal to the required lateral distance to be travelled $D_a$.

Figure 6:
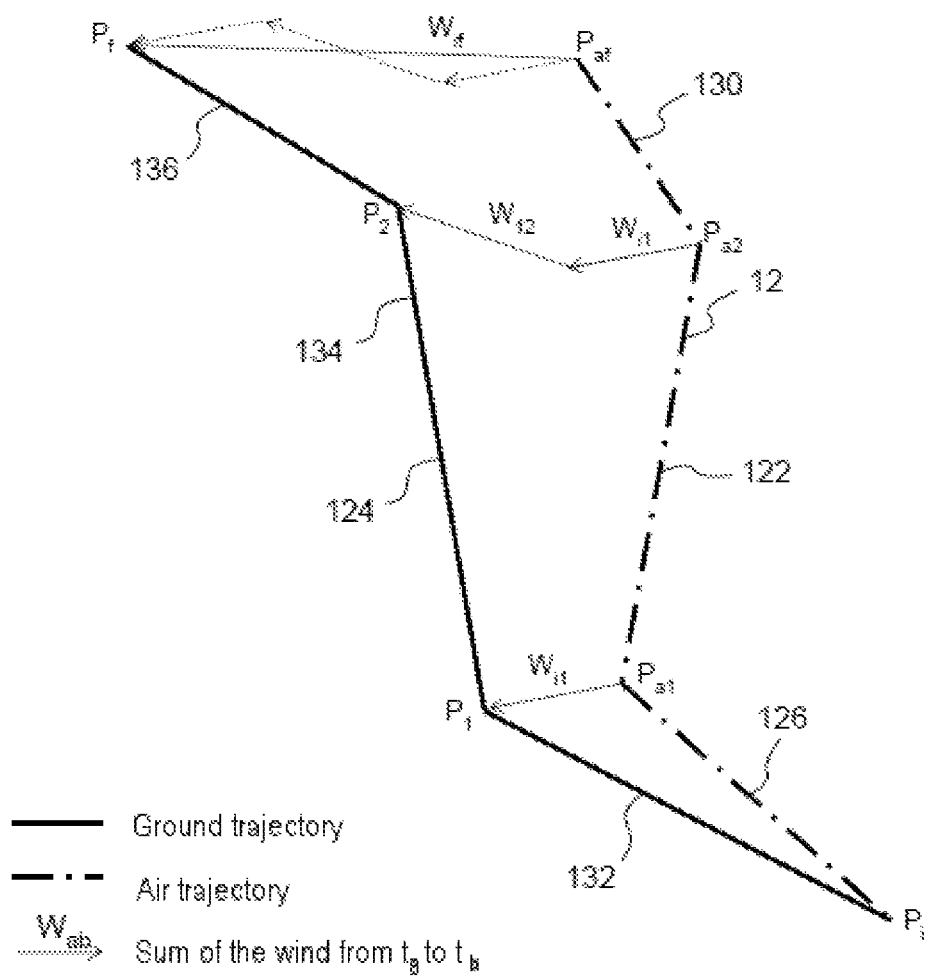
FIG. 6 is an illustration of a lateral trajectory in the air and of a derived lateral geodesic trajectory, determined by using the first embodiment of the third step of FIG. 5.

According to FIG. 6, an exemplary implementation of the third step according to the first embodiment is illustrated through the plot of a horizontal air trajectory 122 computed on the basis of the knowledge of the geodesic positions Pi and Pf, of an altitude h(t) and air speed profile determined in the second step 6, and of the knowledge of the wind, and through a horizontal or lateral geodesic trajectory 124.

The lateral air trajectory 122 is decomposed into three first segments 126, 128, 130 delimited by the successive waypoints $P_i$, $P_{a1}$, $P_{a2}$, $P_{af}$.

The horizontal geodesic trajectory 124 is decomposed into three second segments 132, 134, 136 delimited by the successive waypoints $P_i$, $P_1$, $P_2$ and $P_f$.

The horizontal geodesic trajectory 124 is obtained here on the basis of the lateral air trajectory 122 by sliding respectively the points $P_{a1}$, $P_{a2}$, $P_{af}$ along the vectors $\vec{W}_{t1}$, $\vec{W}_{t1}+\vec{W}_{12}$, $\vec{W}_{t1}+\vec{W}_{12}+\vec{W}_{2f}$, the vectors $\vec{W}_{t1}$, $\vec{W}_{12}$, $\vec{W}_{2f}$ being respectively the sums of the wind between the instants $t_i$ and $t_1$, $t_1$ and $t_2$, $t_2$ and $t_f$.

Figure 7:
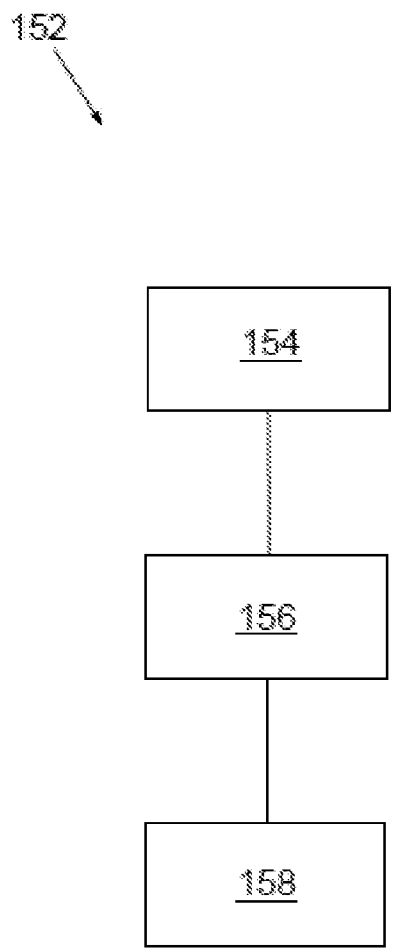
FIG. 7 is a detailed flowchart of a second embodiment of the third step of the method according to the invention of FIG. 1, in which an adjustment of an initial geodesic trajectory, corresponding to a rejoining strategy, is implemented.

According to FIG. 7 and a second embodiment 152 of the third step 8, the third step 152 makes it possible, knowing an adjustable preliminary lateral trajectory, and optionally having available a more precise wind model, dependent on the horizontal position, the altitude and optionally the time, to integrate the position of the aircraft over time, by applying the altitude h(t) and air speed Va(t) profiles, and by evaluating at each instant the inertial speed of the aircraft resulting from the air speed and the speed of the wind. The disparity, obtained during the integration, between the integrated horizontal geodesic distance or the final geodesic stopping position and the horizontal geodesic distance or required final position then make it possible to determine a lateral adjustment of the lateral geodesic trajectory.

The third step 152 comprises a first sub-step 154, a second sub-step 156, and a third sub-step 158, executed successively.

In the first sub-step 154, a preliminary lateral trajectory of a predetermined type adjustable by modification of a parameter, and a wind model dependent on the altitude and optionally the horizontal position and optionally the time are provided.

Next, in the second sub-step 156 the at least one parameter of the adjustable preliminary lateral trajectory is modified so that the geodesic trajectory terminates at the target point of final arrival Qf while taking account of the winds and of the descent profile which is computed in the second step.

Next, in the third sub-step 158, a required or desired horizontal geodesic distance D is determined on the basis of the profiles of altitude h(t) and of air speed of the aircraft Va(t), by evaluating at each instant t the modulus $\|\vec{V}_{g,hor}\|$ of the horizontal geodesic speed of the aircraft on the basis of the air speed Va(t) and of components of the speed of the wind (XW(t), TW(t)), and by integrating the modulus of the horizontal geodesic speed over time and along the adjusted lateral trajectory according to the equations:

$$D=\int_{ti}^{tf}\|\vec{V}_{g,hor}\|dt=\int_{ti}^{tf}(\sqrt{V_a^2-XW^2(t)}+TW(t))dt$$

XW(t) and TW(t) denoting respectively the transverse component and the longitudinal component of the wind at the instant t.

Inspired by the known methods of inter-aircraft spacing, it is for example possible to envisage:

the adjustment of a turning manoeuvre towards a specified point, along the planned route of the aircraft, the adjustment of a turning manoeuvre towards a specified point, along a specified heading.

It is also possible to apply this second embodiment of the third step 152 to the approach phases with capture of the final approach axis. In this case, the capture heading can be adjusted dynamically so as to modify the trajectory length, or else the turning point along the current heading can be computed dynamically so as to capture the final axis, either at a specified distance from the point of capture of the final slope, the said capture point being defined by a point FAF (Final Approach Fix) or by an altitude FCA (Final Capture Altitude), or to ensure capture of the axis according to a specified angle such as 45° or 90°. Each of these manoeuvres determines a degree of freedom or an adjustment parameter, in the form of a distance along an axis or a heading, which is made to vary in order to correct the error of length or of lateral geodesic distance travelled.

Figure 8:
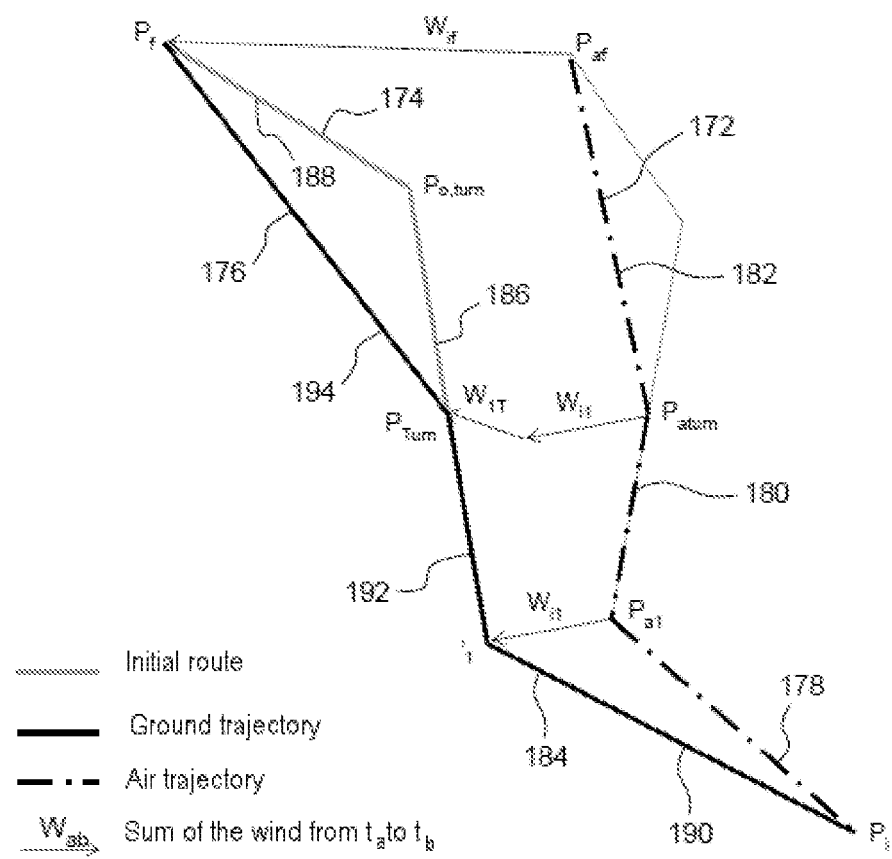
FIG. 8 is an illustration of a first example of an adjusted lateral geodesic trajectory and of the corresponding lateral trajectory of the aircraft in the air.

According to FIG. 8, a first exemplary implementation of the third step according to the second embodiment is illustrated through the plot of a horizontal air trajectory 172 computed on the basis of the knowledge of the geodesic positions Pi and Pf, of an altitude h(t) and air speed profile determined in the second step 6, of the knowledge of the wind and of an adjustable preliminary lateral geodesic trajectory 174, and through an adjusted lateral geodesic trajectory 176.

The lateral air trajectory 172 is decomposed into three first segments 178, 180, 182 delimited by the successive waypoints $P_i$, $P_{a1}$, $P_{aTurn}$, $P_{af}$.

The adjustable preliminary lateral geodesic trajectory 174 is decomposed into three second segments 184, 186, 188, delimited by the successive waypoints $P_i$, $P_1$, $P_{0,\,Turn}$ and $P_f$.

The adjusted lateral geodesic trajectory 176 is decomposed into three third segments 190, 192, 194, delimited by the successive waypoints $P_i$, $P_1$, $P_{Turn}$ and $P_f$.

Both of the lateral geodesic trajectories 174, 176 are a lateral trajectory of the type "follow route then turn", and each comprise a turning point, denoted respectively by $P_{0,\,Turn}$ and $P_{Turn}$, these two turning points being aligned with the point $P_1$.

The two lateral geodesic trajectories 174 and 176 of the same type are each characterized by the distance of their turning point from the point $P_1$ and their turning angle at their respective turning point.

Thus, the distance of the turning point with respect to the point P1 and the turning angle constitute the adjustable parameters or degrees of freedom of this first type of trajectory.

The horizontal geodesic trajectory 176 is obtained here on the basis of the lateral air trajectory 172 by sliding respectively the points $P_{a1}$, $P_{aTurn\,2}$, $P_{af}$ along the vectors $\vec{W}_{t1}$, $\vec{W}_{t1}+\vec{W}_{1T}$, $\vec{W}_{t1}+\vec{W}_{1T}+\vec{WT}_{Tf}=\vec{W}_{tf}$, the vectors $\vec{W}_{t1}$, $\vec{W}_{1T}$, $\vec{W}_{Tf}$ (not represented but deducible from $\vec{W}_{tf}$) being respectively the sums of the wind between the instants $t_i$ and $t_1$, $t_1$ and $t_{Turn}$, $t_{Turn}$ and $t_f$.

Figure 9:
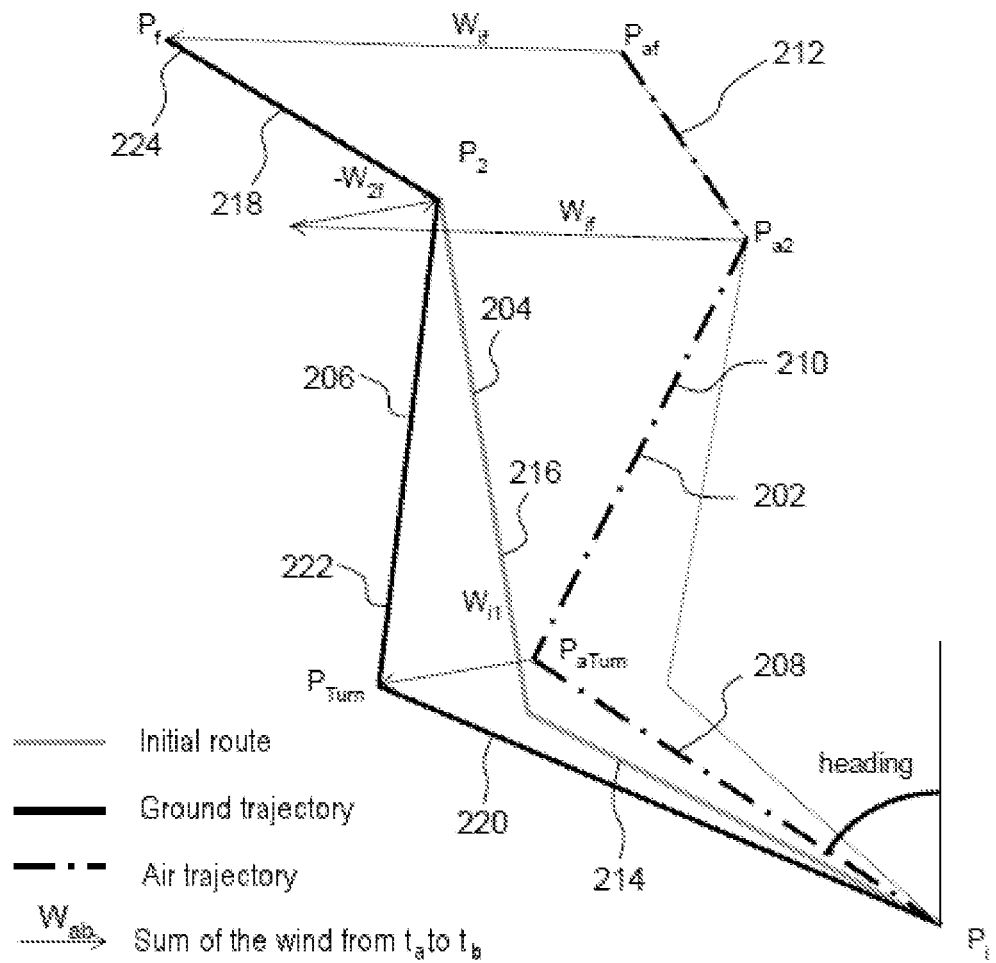
FIG. 9 is an illustration of a second example of an adjusted lateral geodesic trajectory and of the corresponding lateral trajectory in the air.

According to FIG. 9, a second exemplary implementation of the third step according to the second embodiment is illustrated through the plot of a horizontal air trajectory 202 computed on the basis of the knowledge of the geodesic positions Pi and Pf, of an altitude h(t) and air speed profile determined in the second step, of the knowledge of the wind and of an adjustable preliminary lateral geodesic trajectory 204 of a second type, and through an adjusted lateral geodesic trajectory 206.

The lateral air trajectory 202 is decomposed into three first segments 208, 210, 212 delimited by the successive waypoints $P_i$, $P_{aTurn}$, $P_{a2}$, $P_{af}$.

The adjustable preliminary lateral geodesic trajectory 204 is decomposed into three second segments 214, 216, 218, delimited by the successive waypoints $P_i$, $P_{0,Turn}$, $P_2$ and $P_f$.

The adjusted lateral geodesic trajectory 206 is decomposed into three third segments 220, 222, 224, delimited by the successive waypoints $P_i$, $P_{Turn}$, $P_2$ and $P_f$.

Both of the lateral geodesic trajectories 174, 176 are a lateral trajectory of the type "follow a heading then turn" (or "heading then turn"), and each comprise a turning point, denoted respectively by $P_{0,Turn}$ and $P_{Turn}$.

Thus, the angle of heading followed and the turning angle constitute the adjustable parameters or degrees of freedom of this second type of trajectory.

The horizontal geodesic trajectory 206 is obtained here on the basis of the lateral air trajectory 172 by sliding respectively the points $P_{aTurn}$, $P_{a2}$, $P_{af}$ along the vectors $\vec{W}_{t1}$, $\vec{W}_{tf}$, $\vec{W}_{2f}$, $\vec{W}_{tf}$, the vectors $\vec{W}_{t1}$, $\vec{W}_{2f}$, $\vec{W}_{tf}$ being respectively the sums of the wind between the instants $t_i$ and $t_{Turn}$, $t_{Turn}$ and $t_2$, $t_2$ and $t_f$.

Figure 10:
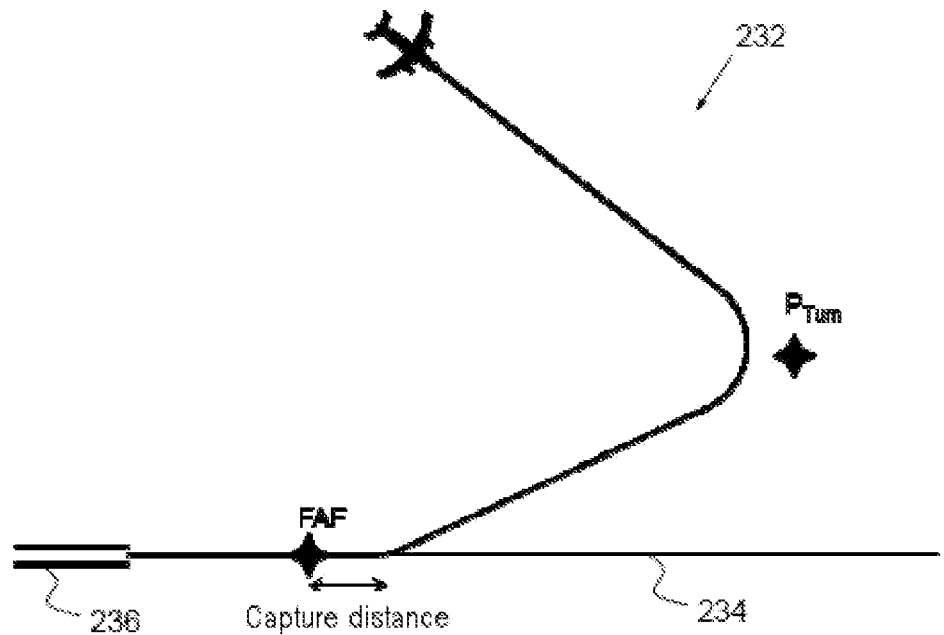
FIG. 10 is a view of an initial lateral geodesic trajectory corresponding to a first rejoining strategy in which the capture of the final axis is adjusted in distance with a specified distance margin.

According to FIG. 10, the horizontal component 232 of the adjustable initial geodesic trajectory corresponding to a third rejoining strategy is illustrated in which the capture of the final axis 234 of alignment with the landing runway 236 is adjusted distance-wise with a specified distance-wise margin or capture distance. Here, the adjustable parameter of the third step is the capture distance.

Figure 11:
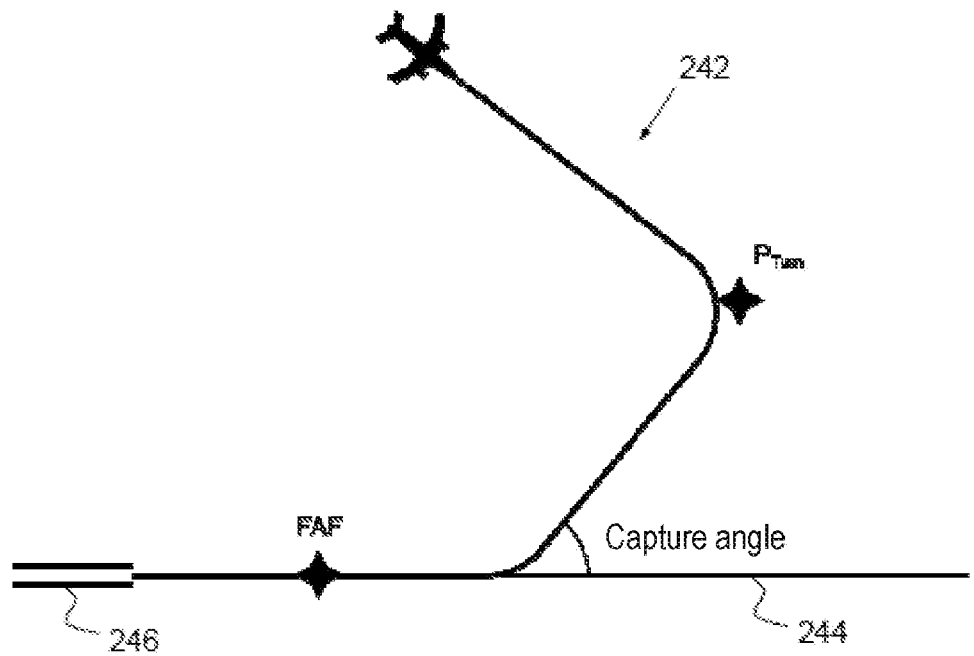
FIG. 11 is a view of the horizontal component of the initial geodesic trajectory corresponding to a second rejoining strategy in which the capture of the final axis is adjusted in distance with a specified capture angle.

According to FIG. 11, the horizontal component 242 of the adjustable initial geodesic trajectory corresponding to a fourth rejoining strategy is illustrated in which the capture of the final axis 244 of alignment with the landing runway 246 is adjusted distance-wise with a specified capture angle. Here, the adjustable parameter of the third step is the capture angle.

Figure 12:
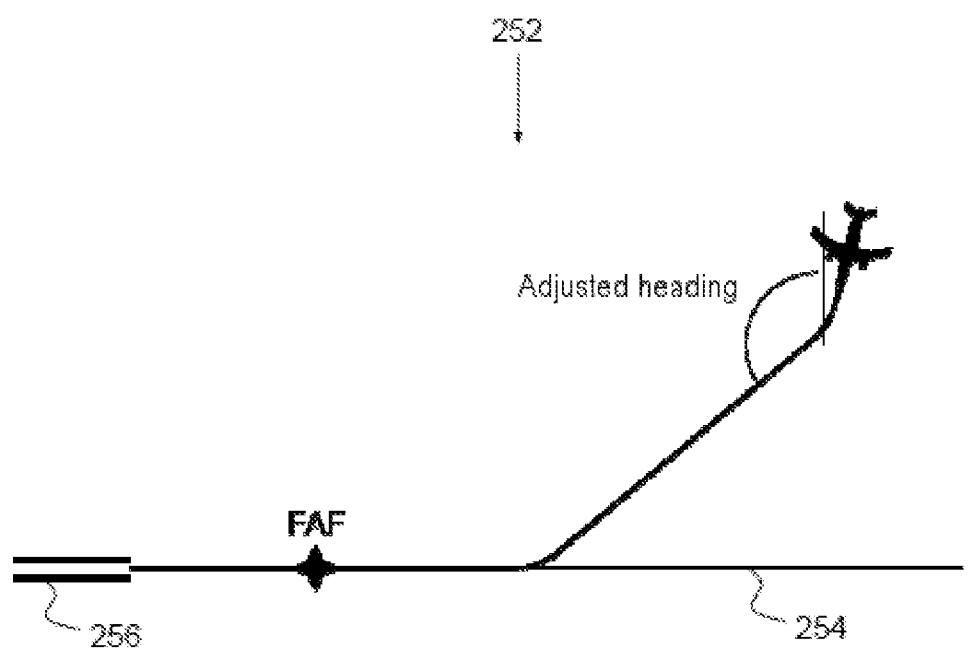
FIG. 12 is a view of an initial lateral geodesic trajectory corresponding to a second rejoining strategy in which the capture of the final axis is adjusted in distance by modifying the heading.

According to FIG. 12, the horizontal component 252 of the adjustable initial geodesic trajectory corresponding to a fifth rejoining strategy is illustrated in which the capture of the final axis 254 of alignment with the landing runway 256 is adjusted distance-wise by modifying the heading. Here, the adjustable parameter of the third step is the heading angle.

Figure 13:
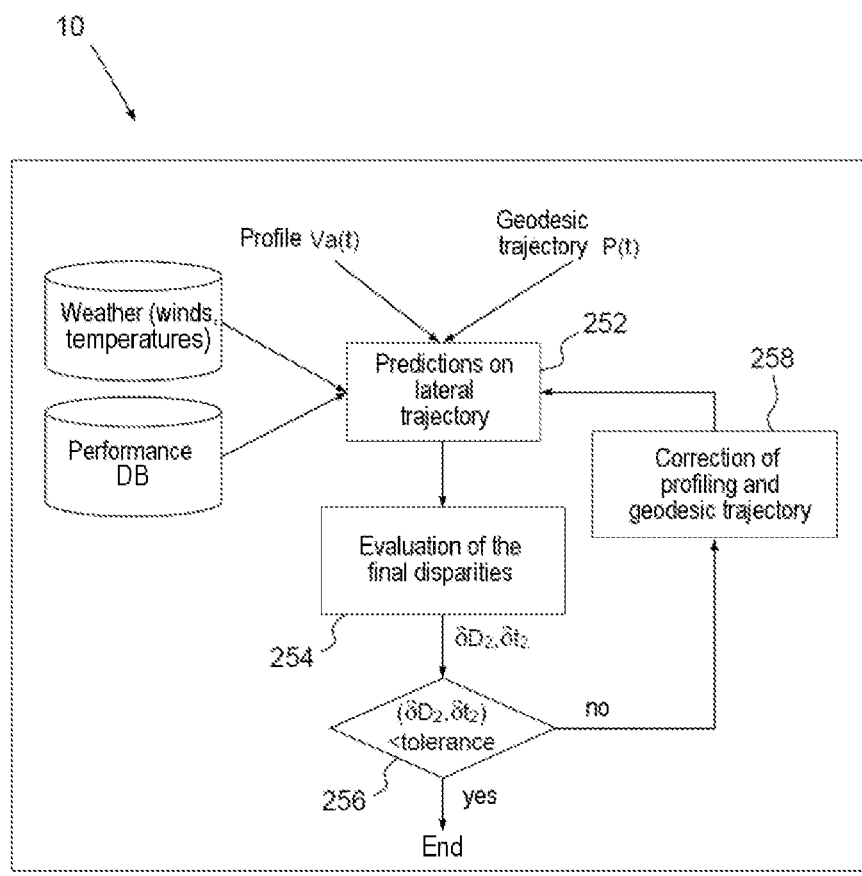
FIG. 13 is a detailed flowchart of the third step of the method according to the invention of FIG. 1 in the course of which corrections are applied to the profile of altitude and of air speed of the aircraft, and to the lateral geodesic trajectory so as to take account of the effects of wind gradients and turning manoeuvres.

According to FIG. 13, the fourth step 10, subsequent to the third step 8, is configured to correct the profiles of altitude h(t) and of air speed Va(t), and of the lateral geodesic trajectory P(t) which are determined respectively in the second and third steps 6, 8, following corrections which take into account, a first effect $\varepsilon_1(t)$ of the wind gradients in the computation of the excess power in the air SEP and/or a second effect $\varepsilon_2(t)$ of the turning manoeuvres on the load factor which modifies the apparent mass in the computation of the variation of the excess power in the air SEP(t).

Indeed, during the implemented computation of the altitude and speed profile in the air mass, several approximations have been made concerning the disregarding of the effect of the wind gradients in the computation of the SEP, and/or the effect of the turning manoeuvres on the load factor, which modifies the apparent mass in the computation of SEP, because of the fact that these effects can only actually be computed upon a lateral trajectory assumption. However, taking them into account, by modifying the values of SEP, influences the altitude and speed profile that it is sought to determine more finely.

The general expression for the excess power SEP(t) in which these corrections are taken into account may be written in the form:

$$SEP(t) = \frac{\vec{V_a(t)}}{g} \cdot \left(\frac{d\vec{V_a(t)}}{dt} + \varepsilon_1(t)\right) + \frac{dh(t)}{dt}(1 + \varepsilon_2(t))$$

where g denotes the acceleration due to gravity in the vicinity of the surface of the Earth.

According to FIG. 13, the fourth step 10 is an iterative process, comprising first, second, third, fourth sub-steps 252, 254, 256, 258, executed in a loop 260.

The first sub-step 252, executed initially at the end of the third step 8 and subsequent to the fourth sub-step 258 when at least one iteration has been decided in the course of the third sub-step 256, consists in determining in a conventional manner a temporal evolution of a state vector of the aircraft including at least the altitude h(t), the air speed of the aircraft Va(t), the lateral geodesic distance travelled D(t) along the current geodesic trajectory P(t), initially determined at the start of a first iteration in the third step 8 or determined in the course of the fourth sub-step 258 of the fourth step 10, by taking into account the wind gradients and the load factor of the turning manoeuvres in the computation of the excess power variation SEP(t) until either the final position, or the final altitude is reached at a stopping point of the current geodesic trajectory. A conventional determination of the temporal evolution of a state vector of the aircraft is for example described in the thesis by Wissem Maazoun, entitled "Conception et analyse d'un système d'optimisation de plans de vol pour les avions" [Design and analysis of a system for optimizing flight plans for aircraft] and presented in April 2015 at the University of Montreal.

The second sub-step 254, executed subsequent to the first sub-step 252, consists in the fact that raw disparities $\delta D_1$, $\delta t_1$, $\delta h$, $\delta V_a$, relating to the lateral geodesic distance travelled, the time, the altitude and the air speed are evaluated between the state of the aircraft, considered at the stopping point and computed by taking into account the correction effects, and the desired final state, and in the fact that refined disparities $\delta D_2$, $\delta t_2$, relating to the lateral geodesic distance travelled and the time are evaluated as a function of the raw disparities $\delta D_1$, $\delta t_1$, between the state of the aircraft, considered at the stopping point and computed by taking into account the correction effects, and the desired final state.

The third sub-step 256 of testing and of decision of execution of an iteration of the loop 260, executed subsequent to the second sub-step 254, consists in the fact that the refined disparities $\delta D_2$, $\delta t_2$ of lateral geodesic distance travelled and of time of arrival at the stopping point are compared with a loop exit stopping threshold σ, a branching is carried out to the fourth sub-step 258 when at least one of the refined disparities $\delta D_2$, $\delta t_2$ is greater than or equal to the stopping threshold σ, and a stopping of the fourth step is carried out when the two refined disparities $\delta D_2$, $\delta t_2$ are strictly less than the stopping threshold σ. The stopping threshold σ is a tolerance threshold, dimensioned according to the magnitude of the corrections for additional thrust or drag which are deemed admissible during the aircraft manoeuvre. It should be noted that the iterations can also be stopped when the feasibility bounds are reached, either laterally when the distance obtained is the most direct possible distance for the manoeuvre considered, or in the speed domain when the speed obtained is the speed limited by the flight envelope.

The fourth sub-step 258, executed when at least one of the refined disparities $\delta D_2$, $\delta t_2$ is greater than or equal to the stopping threshold σ consists in the fact that the current profile of altitude h(t) and of air speed Va(t) is readjusted by taking into account the refined time disparity and by reusing the method for adjusting the profile of the second step 6, and then the lateral trajectory manoeuvre is readjusted by taking into account the refined distance disparity and by reusing the method for adjusting the lateral trajectory of the third step to obtain an updated current geodesic trajectory.

Preferably, the refined disparities $\delta D_2$, $\delta t_2$ of geodesic distance travelled and of time of arrival at the stopping point are functions of the raw disparities $\delta D_1$, $\delta t_1$, between the state of the aircraft, considered at the stopping point and computed by taking into account the correction effects, and the desired final state, according to the relations:

$$\delta t_2 = \delta t_1 + \frac{\delta h + \frac{1}{g}\delta V_a\left(V_{af} + \frac{\delta V_a}{2}\right)}{SEP_f} \text{ and } \delta D_2 = \delta D_1 + \frac{1}{2}\cdot \delta t_2 \cdot V_f$$

$V_f$ and $SEP_f$ denoting respectively the final speed and the excess power variation at the stopping point $P(t_f)$.

Indeed, the new preferred time disparity $\delta t_2$ makes it possible to adjust the definition of the altitude and speed profile h(t) and Va(t), according to a correction similar to that applied in the initial search for these profiles, performed in the second and third steps 6, 8. The change of profile obtained, which is aimed at modifying the duration of energy dissipation, will also translate into a modification of the required distance. However, an increase (respectively a reduction) in the duration of dissipation generally requires a reduction (respectively an increase) in the speed. The effects on the lateral distance travelled are therefore opposite, and as a first approximation, it would be possible to suppose that they compensate one another and to simply apply a correction of length $\delta D_1$ on the lateral trajectory. However, considering that the speed has a quadratic effect on the energy dissipation, the drag varying as the square of the speed, and linear on the length, more efficient convergence is ensured by applying the preferred distance correction $\delta D_2$.

Figure 14:
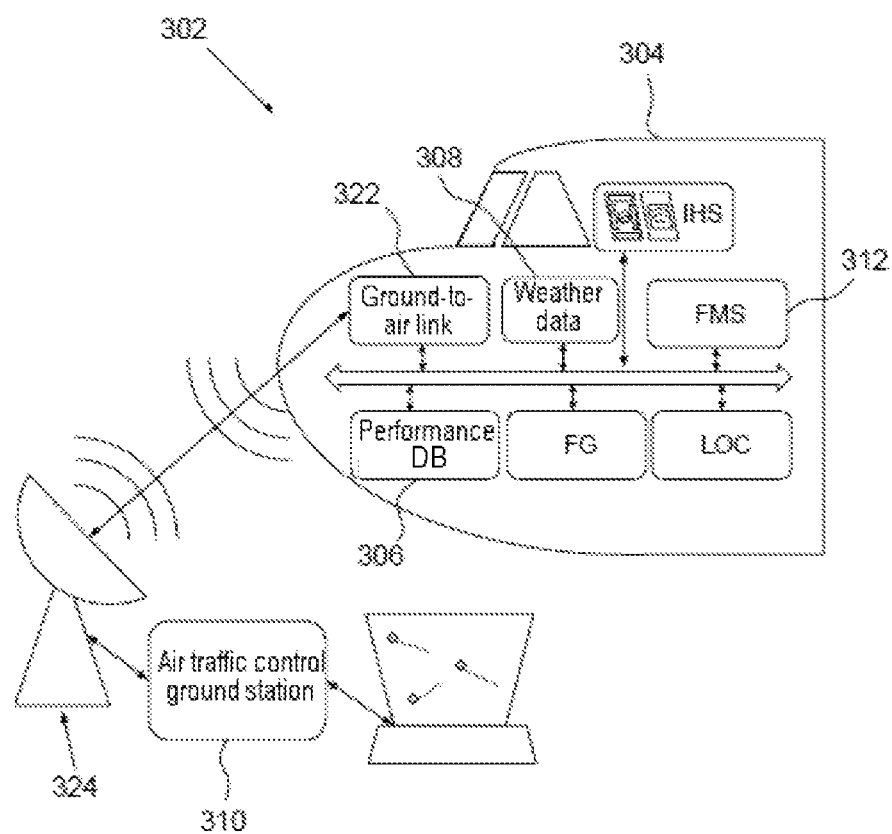
FIG. 14 is a view of an architecture of a system according to the invention implementing the method according to the invention of FIG. 1.

According to FIG. 14, a system 302 for determining a minimum-thrust descent and rejoining profile in respect of a target point by an aircraft 304 comprises a database 306 of the performance of the aircraft, a means 308 for providing meteorological data of the environment in which the aircraft is deploying, an air traffic control ground station 310 for providing a required final time $t_f$ or of a required temporal timespan $\Delta t_{required}$, of arrival of the aircraft 304 at the target point, and one or more electronic computers 312 for computing the minimum-thrust descent and rejoining profile in respect of the target point.

According to FIG. 14 and in a particular manner, the at least one electronic computer 312 for computing the minimum-thrust descent and rejoining profile in respect of the target point is the flight management system FMS, and the means 308 for providing meteorological data comprises a database or memory for storing the meteorological data on-board the aeroplane.

The descent profile, followed permanently in an engine regime under constant and minimum thrust, is defined from a first initial state of the aircraft 304 up to a second final state of the aircraft 304 constrained temporally by the final time of arrival tf at the target point or a required temporal timespan $\Delta t$.

The first initial state of the aircraft comprises a first geodesic position Qi of departure, an initial time ti, a first initial altitude hi, a first initial speed of the aircraft $\vec{Vi}$ relative to the ground and a first wind speed $\vec{Wi}$.

The second final state of the aircraft comprises a second geodesic position Qf of arrival at the target point, a final constraint time tf, a second final altitude hf, a second final speed of the aircraft $\vec{Vf}$ relative to the ground and a second wind speed $\vec{Wf}$.

The determining system 302 is configured to:

in a first step, compute an energy differential of the aircraft in the air $\Delta E_a$ between the first initial state of the aircraft and the second final state of the aircraft, and then in a second step, provide a parametric model of profile of altitude h(t) and of air speed Va(t) of the aircraft 304 corresponding to an air speed strategy with permanently a minimum engine thrust, and then adjust parameters of the said parametric model so that the adjusted parametric model of profile of altitude h(t) and of air speed va(t) of the aircraft ensures the consumption of the variation of energy of the aircraft in the air $\Delta E_a$ within the required timespan $\Delta t_{required}$, and the required altitude variation hf-hi in the required time with permanently a minimum engine thrust; and then in a third step, determine a geodesic trajectory of the aircraft and a lateral geodesic trajectory on the basis of a type of lateral manoeuvre, of the adjusted altitude profile h(t), of the adjusted air speed profile va(t) and of the knowledge of the speeds of the winds in the aircraft's scheduled geographical traversal zone.

According to a first particular system configuration 302 of FIG. 14 and a first operative mode, the aircraft 304 comprises a first computer, here the FMS computer, configured to compute on-board a required intermediate descent speed CAS and a required flight distance, and first transmission means 322 for dispatching these two prerequisite parameters, and the air traffic control station 310 comprises second transmission means 324 for receiving the required intermediate descent speed CAS and the required flight distance and for dispatching to the aircraft 304 setpoints for defining a lateral trajectory and a speed, the said setpoints being determined by a second computer of the ground station so as to ensure the flight distance and the intermediate speed required.

According to a second configuration, the ground station is configured to dispatch to the aircraft as a supplement to the required timespan, a point of convergence along the flight plan, and the first computer of the aircraft is configured to determine the required intermediate speed CAS and the required geodesic distance, and to identify a turning point, either along a holding of current heading by a trajectory alignment, or along the current flight plan, by trajectory shortening, followed by direct flight towards the convergence point. The turning point is then transmitted to the ground, the flight plan modified accordingly, and the lateral and speed-wise guidance is activated on board.

According to a third configuration, the ground station is configured to compute the required intermediate descent speed CAS and a required flight distance, to prompt the ground operator with a lateral trajectory offering the required flight distance, and transmit to the crew under the control of the operator the said lateral trajectory, in the form of a new flight plan, of a required trajectory, or of a succession of heading instructions, making it possible in all cases to ensure synchronization under the most economically favourable conditions for the aircraft.

Generally, the aircraft is included in the set of aeroplanes piloted on-board manually or in automatic mode and of drones piloted remotely manually or in automatic mode.

Generally, the at least one electronic computer for determining a minimum-thrust descent and rejoining profile in respect of a target point is:

an electronic computer integrated into a flight management system FMS, or an EFB or any embedded computer for aiding navigation but not integrated into the avionics of the aircraft, or a computer integrated into an air traffic control ground station, as decision aid for a controller, or a computer integrated into a drone's mission management ground station.

The method and the system which are described hereinabove for determining a minimum-thrust descent and rejoining profile in respect of a target point by an aircraft, therefore make it possible to satisfy a temporal constraint at a target point of the descent, while maintaining a minimum thrust and while securing final stabilization of the aircraft before landing. This method takes into account the aircraft's descent performance, as well as the impact of the wind during the descent. It can apply in all configurations of trajectories making it possible to introduce some flexibility in the lateral trajectory length, and operational examples of such trajectories are:

the adjustment of a turning manoeuvre towards a specified point, along the planned route of the aircraft, the adjustment of a turning manoeuvre towards a specified point, along a specified heading, the adjustment of the capture of the final approach axis by modifying the capture heading, the adjustment of the capture of the final approach axis by holding the heading up to a turning point, and then capture according to a specified angle, the adjustment of the capture of the final approach axis by holding the heading up to a turning point, and then capture with a specified distance margin.

The invention claimed is:

1. A method for determining a minimum-thrust descent and rejoining profile in respect of a target point by an aircraft, the permanently minimum-thrust descent profile being defined from a first initial state of the initial aircraft up to a second final state of the aircraft temporally constrained, the first initial state of the aircraft comprising a first geodesic position Qi of departure, an initial time ti, a first initial altitude hi, a first initial speed of the aircraft $\vec{Vi}$ relative to the ground and a first wind speed $\vec{Wi}$, the second final state of the aircraft comprising a second geodesic position Qf of arrival at the target point, a final constraint time tf, a second final altitude hf, a second final speed of the aircraft $\vec{Vf}$ relative to the ground and a second wind speed $\vec{Wf}$, the method comprising a first step of computing an energy differential of the aircraft in the air $\Delta E_a$ between the first initial state of the aircraft and the second final state of the aircraft; and a second step, subsequent to the first step of providing an adjustable modelled profile of altitude $h_m(t)$ and of air speed $Va_m(t)$ of the aircraft, corresponding to an air descent strategy which permanently ensures an engine regime at minimum thrust and using one or more adjustable parameters, and then adjusting the adjustable parameter or parameters so that an adjusted profile of altitude $h(t)$ and of air speed $va(t)$ of the aircraft ensures the consumption of the variation of energy of the aircraft in the air $\Delta E_a$ within the required timespan $\Delta t_{required}$, and the required altitude variation $h_i-h_f$ within the required timespan with permanently an engine regime with constant and minimum thrust; and a third step, subsequent to the second step, of determining a lateral geodesic trajectory P(t) of the aircraft on the basis of the adjusted altitude profile h(t), of the adjusted air speed profile Va(t) and of the knowledge of the speeds of the winds in the aircraft's scheduled geographical traversal zone.

2. The method for determining a minimum-thrust descent and rejoining profile in respect of a target point by an aircraft according to claim 1, wherein the first step consists in determining the differential of the energy of the aircraft in the air $\Delta E_a$ as the difference $E_{ai}-E_{af}$ between the energy of the aircraft in the air in the initial state $E_{ai}$ and the energy of the aircraft in the air in the final state $E_{af}$, the energy of the aircraft in the air $E_{ai}$ in the initial state being equal to the sum $E_{Ti}+E_{Wi}$ of the total energy $E_{Ti}$ of the aircraft in the initial state and of a first corrective term $E_{Wi}$ for the effect of the winds in the initial state on the air slope followed by the aircraft, and the energy of the aircraft in the air $E_{af}$ in the final state being equal to the sum $E_{Tf}+E_{Wf}$ of the total energy $E_{Tf}$ of the aircraft in the final state and of a second corrective term $E_{Wf}$ for the effect of the winds in the final state on the air slope followed by the aircraft, with $$E_{Ti} = \frac{1}{2}m(t_i)V_i^2 + m(t_i) \cdot g \cdot h_i \text{ and}$$

$$E_{Wi} = -\frac{1}{2}m(t_i)W_i^2 - m(t_i) \cdot (\vec{V}_i - \vec{W}_i) \cdot \vec{W}_i \text{ and}$$

$$E_{Tf} = \frac{1}{2}m(t_f) \cdot V_f^2 + m(t_f) \cdot g \cdot h_f \text{ and}$$

$$E_{Wf} = -\frac{1}{2}m(t_f) \cdot W_f^2 - m(t_f) \cdot (\vec{V}_f - \vec{W}_f) \cdot \vec{W}_f$$

and $m(t_i)$, $m(t_f)$ denoting the mass of the aircraft respectively at the initial instant $t_i$ and the final instant $t_f$.

3. The method for determining a minimum-thrust descent and rejoining profile in respect of a target point by an aircraft according to claim 1, wherein the adjustable modelled profile of altitude $h_m(t)$ and of air speed $Va_m(t)$ of the aircraft is decomposed into a temporal succession of a number N, greater than or equal to 2, of adjustable elementary profiles of altitude $h_m(k,t)$ and of air speed $Va_m(k,t)$ of the aircraft, the index k being an identification index identifying the order of temporal succession of the adjustable elementary profiles $h_m(k, t)$, $Va_m(k,t)$ lying between 1 and N; and the elementary profile $h_m(1, t)$ and $Va_m(1, t)$ evolves over a first elementary time interval IT(1) lying between the initial time ti and a first intermediate time t(2) forming respectively the times associated with the first initial state and with a first intermediate state of the aircraft; and for k varying between 2 and N−1, the elementary profile $h_m(k, t)$ and $Va_m(k, t)$ evolves over a k-th elementary time interval IT(k) lying between a (k−1)-th intermediate time t(k) and a k-th intermediate time t(k+1) forming respectively the times associated with the (k−1)-th intermediate state and with the k-th intermediate state of the aircraft; and the elementary profile $h_m(N, t)$ and $Va_m(N, t)$ evolve over an N-th elementary time interval IT(N) lying between the (N−1)-th intermediate time t(N) and the final time tf forming respectively the times associated with the (N−1)-th intermediate state and with the second final state of the aircraft; and two consecutive intervals IT(k), IT(k+1) for k varying from 1 to N−1 are contiguous, the adjustable profiles $h_m(k,t)$ and $Va_m(k,t)$, for k varying from 1 to N correspond to phases $\Phi(k)$ of descent under constant and minimum engine regime, the phases of descent under constant and minimum engine regime included in the set formed by the descent phases with constant speed CAS, the constant-acceleration phases and the deceleration phases with constant energy ratio ER.

4. The method for determining a minimum-thrust descent and rejoining profile in respect of a target point by an aircraft according to claim 3, wherein for each descent phase $\Phi(k)$ and the corresponding adjustable profile $h_m(k, t)$ and $Va_m(k,t)$, k varying from 1 to N, the start instant of the interval IT(k), t(k), the end instant of the interval IT(k), t(k+1), the altitudes $h_m(t(k))$, and $h_m(t(k+1))$, the air speeds of the aircraft $Va_m(k, t(k))$ and $Va_m((k,t(k+1))$, the excess powers $SEP_m(k, t(k))$, $SEP_m(k, t(k+1))$, corresponding respectively to the two instants t(k) and t(k+1) are linked by the relation:

$$\frac{SEP_m(k, t(k)) - SEP_m(k, t(k+1))}{2} \cdot (t(k+1) - t(k)) =$$
$$[h_m(t(k+1)) - h_m(t(k))] + \frac{Vam^2(k, t(k+1)) - Vam^2(k, t(k))}{2g}.$$

5. The method for determining a minimum-thrust descent and rejoining profile in respect of a target point by an aircraft according to claim 3, wherein, for k varying from 1 to N, when the adjustable profiles $h_m(k, t)$ and $Va_m(k,t)$ correspond to a phase $\phi(k)$ of descent with bounded constant acceleration and under constant and minimum engine regime, the duration $\Delta t_m(k)$ of the k-th elementary interval IT(t) and the altitude variation $\Delta h_m(k)$ over the said interval IT(k) satisfy the equations:

$$\Delta t_m(k) = \frac{V_{am}(k, t(k+1)) - V_{am}(k, t(k))}{A} \text{ and}$$

$$\Delta h_m(k) = \left(\frac{SEP_m(k, t(k)) + SEP_m(k, t(k+1))}{2A} - \frac{Vam(t(k)) + Vam(t(k+1))}{2g}\right) \cdot$$
$$(V_{am}(t(k+1)) - V_{am}(t(k)))$$

when the adjustable profiles $h_m(k, t)$ and $Va_m(k,t)$ correspond to a phase $\phi(k)$ of descent with constant CAS speed or Mach number and under constant and minimum engine regime, the duration $\Delta t_m(k)$ of the k-th elementary interval IT(t) and the altitude variation $\Delta h_m(k)$ over the said interval IT(k) satisfy the equations $$\Delta h_m(k) = h_m(k, t(k+1)) - h_m(k, t(k)) \text{ and}$$
$$\Delta t_m(k) = \frac{2}{SEP_m(k, t(k)) + SEP_m(k, t(k+1))} \cdot$$
$$\left(\Delta h_m(k) + \frac{Vam^2(t(k+1)) - Vam^2(t(k))}{2g}\right)$$

when the adjustable profiles h(k, t) and Va(k,t) correspond to a phase $\Phi(k)$ of descent under deceleration with constant energy ratio ER and under constant and minimum engine regime, the duration $\Delta t(k)$ of the k-th elementary interval IT(t) and the altitude variation $\Delta h(k)$ over the said interval IT(k) satisfy the equations:

$$\Delta t_m(k) = \frac{2}{ER \cdot (SEP_m(k, t(k)) + SEP_m(k, t(k+1)))} \cdot \left(\frac{Vam^2(t(k+1)) - Vam^2(t(k))}{2g}\right)$$

and $$\Delta h_m(k) = \frac{(1 - ER)}{ER} \cdot \frac{(Vam^2(t(k+1)) - Vam^2(t(k)))}{2g}.$$

6. The method for determining a minimum-thrust descent and rejoining profile in respect of a target point by an aircraft according to claim 3, wherein the parametric model of profile of altitude h(t) and of air speed va(t) of the aircraft to be adjusted comprises three successive phases:

a first phase of acceleration/deceleration to a desired speed CAS, and then a second phase at the constant desired speed CAS, and then a third phase of acceleration/deceleration to the final speed, the desired speed CAS and the durations of the three phases being adjusted so as to satisfy the total duration constraint $\Delta t_{required}$ as well as the duration of the altitude variation constraint $h_i - h_f$.

7. The method for determining a minimum-thrust descent and rejoining profile in respect of a target point by an aircraft according to claim 3, wherein the modelled profile of altitude h(t) and of air speed Va(t) of the aircraft to be adjusted comprises three successive phases:

a first phase at the initial speed CAS on a first altitude slice $\Delta h(1)$ with an adjustable duration making it possible to vary a deceleration start instant, and then a second phase of deceleration from the initial speed CAS to the final speed CAS, and then a third phase of descent at the final speed CAS until the final altitude, the altitude variation $\Delta h(1)$ before the deceleration is adjusted iteratively to obtain the duration of the first phase.

8. The method for determining a minimum-thrust descent and rejoining profile in respect of a target point by an aircraft according to claim 1, wherein the third step comprises a first sub-step in the course of which, horizontal positions of departure and arrival, $P_{ai}$ and $P_{af}$, within the air mass are determined on the basis of departure and arrival horizontal geodesic positions, Pi and Pf, and of the horizontal speed of the wind $\overrightarrow{W_{hor}}(h)$ by assuming that the speed and the direction of the wind depend only on the altitude h and by using the relation:

$$\overrightarrow{P_{ai}P_{af}} = \overrightarrow{P_iP_f} - \int_{ti}^{tf}\overrightarrow{W_{hor}}(h(t))dt$$

and a second sub-step of determining a required lateral distance in the air to be travelled $D_a$ on the basis of the air speed profile of the aircraft Va(t) and of the air slope γ(t) by using the equation:

$$D_a = \int_{t1}^{t2} V_a(t) \cdot \cos(\gamma(t))dt$$

a third sub-step of determining a lateral trajectory in the air Pa(t) joining the departure and arrival horizontal positions, Pai and Paf and taking into account the vectors of initial and final air speed, the length of the lateral trajectory in the air Pa(t) being constrained by being set equal to the required lateral distance in the air to be travelled $D_a$, a fourth sub-step of computing a geodesic lateral trajectory Pa(t) deduced on the basis of lateral trajectory in the air Pa(t) and of the wind chart.

9. The method for determining a minimum-thrust descent and rejoining profile in respect of a target point by an aircraft according to claim 1, wherein the third step comprises a first sub-step of providing a preliminary lateral trajectory of a predetermined type adjustable by modification of a parameter, and a wind model dependent on the altitude and optionally the horizontal position and optionally the time, and a second sub-step of adjusting the at least one parameter of the preliminary lateral trajectory in the course of which the at least one adjustment parameter is modified so that the horizontal geodesic distance travelled along the preliminary lateral trajectory, adjusted by taking account of the winds, terminates precisely at the final geodesic position $P_f$, and a third sub-step of determining a required horizontal geodesic distance on the basis of the profiles of altitude h(t) and of air speed of the aircraft Va(t), by evaluating at each instant t the modulus $\|\overrightarrow{V_{g,hor}}\|$ of the horizontal geodesic speed of the aircraft on the basis of the air speed Va(t) and of components of the speed of the wind (XW(t), TW(t)), and by integrating over time the modulus of the horizontal geodesic speed according to the equations:

$$D=\int_{t1}^{t2}\|\overrightarrow{V_{g,hor}}\|dt=\int_{t1}^{t2}(\sqrt{V_a^2-XW^2(t)}+TW(t))dt$$

XW(t) and TW(t) denoting respectively the transverse component and the longitudinal component of the wind at the instant T.

10. The method for determining a minimum-thrust descent and rejoining profile in respect of a target point by an aircraft according to claim 1, further comprising a fourth step, subsequent to the third step, of corrections of the profiles of altitude h(t) and of air speed of the aircraft Va(t), and of the lateral geodesic trajectory, determined respectively in the second and third steps, which take into account, a first effect $\varepsilon_1(t)$ of the wind gradients in the computation of the excess power in the air SEP and/or a second effect $\varepsilon_2(t)$ of the turning manoeuvres on the load factor which modifies the apparent mass in the computation of the variation of the excess power in the air SEP(t), the general expression for the excess power in the air SEP(t) being written in the form:

$$SEP(t) = \frac{\overrightarrow{V_a(t)}}{g} \cdot \left(\frac{d\overrightarrow{V_a(t)}}{dt} + \varepsilon_1(t)\right) + \frac{dh(t)}{dt}(1+\varepsilon_2(t))$$

where g denotes the acceleration due to gravity in the vicinity of the surface of the Earth.

11. The method for determining a minimum-thrust descent and rejoining profile in respect of a target point by an aircraft according to claim 10, wherein the fourth step is an iterative process, comprising first, second, third, fourth sub-steps executed in a loop; and the first sub-step, executed initially at the end of the third step and subsequent to the fourth sub-step when at least one iteration has been decided in the course of the third sub-step, wherein determining in a conventional manner a temporal evolution of a state vector of the aircraft including at least the altitude h(t), the air speed of the aircraft Va(t), the geodesic distance travelled D(t) along the current geodesic trajectory P(t), initially determined at the start of a first iteration in the third step or determined in the course of the fourth sub-step of the fourth step, by taking into account the wind gradients and the load factor of the turning manoeuvres in the computation of the excess power variation SEP(t) until either the final position, or the final altitude is reached at a stopping point of the current geodesic trajectory; and the second sub-step, executed subsequent to the first sub-step, wherein the fact that raw disparities $\delta D_1$, $\delta t_1$, $\delta h$, $\delta V_a$, relating to the geodesic distance travelled, the time, the altitude, the air speed, are evaluated between the state of the aircraft, considered at the stopping point and computed by taking into account the correction effects, and the desired final state, and wherein the fact that refined disparities $\delta D_2$, $\delta t_2$, relating to geodesic distance travelled and time, are evaluated as a function of the raw disparities $\delta D_1$, $\delta t_1$, between the state of the aircraft, considered at the stopping point and computed by taking into account the correction effects, and the desired final state, the third sub-step of test and decision of execution of an iteration of the loop, executed subsequent to the second sub-step, wherein the fact that the refined disparities $\delta D_2$, $\delta t_2$ of geodesic distance travelled and of time of arrival at the stopping point are compared with a loop exit stopping threshold $\varepsilon$, a branching is carried out to the fourth sub-step when at least one of the refined disparities $\delta D_2$, $\delta t_2$ is greater than or equal to the stopping threshold, and a stopping of the fourth step is carried out when the two refined disparities $\delta D_2$, $\delta t_2$ are strictly less than the threshold, the fourth step is terminated; and the fourth sub-step, executed when at least one of the refined disparities $\delta D_2$, $\delta t_2$ is greater than or equal to the stopping threshold, wherein the fact that the current profile of altitude h(t) and of air speed Va(t) is readjusted by taking into account the refined time disparity and by reusing the method for adjusting the profile of the second step, and then the lateral trajectory manoeuvre is readjusted by taking into account the refined distance disparity and by reusing the method for adjusting the lateral trajectory of the third step to obtain an updated current geodesic trajectory.

12. The method for determining a minimum-thrust descent and rejoining profile in respect of a target point by an aircraft according to claim 11, wherein the refined disparities $\delta D_2$, $\delta t_2$ of geodesic distance travelled and of time of arrival at the stopping point are functions of the raw disparities $\delta D_1$, $\delta t_1$, between the state of the aircraft, considered at the stopping point and computed by taking into account the correction effects, and the desired final state, according to the relations:

$$\delta t_2 = \delta t_1 + \frac{\delta h + \frac{1}{g}\delta V_a\left(V_f + \frac{\delta V_a}{2}\right)}{SEP_f} \text{ and } \delta D_2 = \delta D_1 + \frac{1}{2} \cdot \delta t_2 \cdot V_f$$

$V_f$ and $SEP_f$ denoting respectively the final speed and the excess power variation at the stopping point $P(t_f)$.

13. The method for determining a minimum-thrust descent and rejoining profile in respect of a target point by an aircraft according to claim 1, wherein
the aircraft is included in the set of aeroplanes piloted on-board manually or in automatic mode and of drones piloted remotely manually or in automatic mode.

14. A system for determining a minimum-thrust descent and rejoining profile in respect of a target point by an aircraft, the permanently minimum-thrust descent profile being defined from a first initial state of the initial aircraft up to a second final state of the aircraft constrained temporally by a final arrival time tf or a required temporal timespan $\Delta t_{required}$,
the first initial state of the aircraft comprising a first geodesic position Qi of departure, an initial time ti, a first initial altitude hi, a first initial speed of the aircraft $\vec{Vi}$ relative to the ground and a first wind speed $\vec{Wi}$,
the second final state of the aircraft comprising a second geodesic position Qf of arrival at the target point, a final constraint time tf, a second final altitude hf, a second final speed of the aircraft $\vec{Vf}$ relative to the ground and a second wind speed $\vec{Wf}$,
the said determining system comprising a database of the performance of the aircraft, a means for providing meteorological data of the environment wherein the aircraft is deploying, a ground station for providing the required final time or a required temporal timespan to the aircraft, and one or more electronic computers for computing the minimum-thrust descent and rejoining profile in respect of a target point,
the said determining system being configured to
in a first step, compute an energy differential of the aircraft in the air $\Delta E_a$ between the first initial state of the aircraft and the second final state of the aircraft, and then
in a second step, provide an adjustable modelled profile of altitude $h_m(t)$ and of air speed $V_{am}(t)$ of the aircraft corresponding to an air speed strategy with permanently a minimum engine thrust, and then adjust parameters of the said adjustable modelled profile so that the adjusted modelled profile obtained of altitude h(t) and of air speed Va(t) of the aircraft ensures the consumption of the variation of energy of the aircraft in the air $\Delta E_a$ within the required timespan $\Delta t_{required}$, and the required altitude variation $h_i-h_f$ in the required time with permanently a minimum engine thrust; and then
in a third step, determine a geodesic trajectory of the aircraft and a lateral geodesic trajectory on the basis of a type of lateral manoeuvre, of the adjusted altitude profile h(t), of the adjusted air speed profile va(t) and of the knowledge of the speeds of the winds in the aircraft's scheduled geographical traversal zone.

15. The system for determining a minimum-thrust descent and rejoining profile in respect of a target point by an aircraft according to claim 14, wherein
the at least one electronic computer for determining a computation of a minimum-thrust descent and rejoining profile is
an electronic computer integrated into a flight management system FMS,
an EFB or any embedded computer for aiding navigation but not integrated into the avionics of the aircraft,
a computer integrated into an air traffic control ground station, as decision aid for a controller,
a computer integrated into a drone's mission management ground station.

16. The system for determining a minimum-thrust descent and rejoining profile in respect of a target point by an aircraft according to claim 14, wherein
according to a first configuration, the aircraft comprises a first computer, configured to compute on-board a required intermediate descent speed CAS and a required flight distance, and first transmission means for dispatching these two prerequisite parameters, and the air traffic control station comprises second transmission means for receiving the required intermediate descent speed CAS and the required flight distance and dispatching to the aircraft setpoints for defining a lateral trajectory and a speed, the said setpoints being determined by a second computer of the ground station so as to ensure the flight distance and the intermediate speed required, or
according to a second configuration, the ground station is configured to dispatch to the aircraft as a supplement to the required timespan, a point of convergence along the flight plan, and the first computer of the aircraft is configured to determine the required intermediate speed CAS and the required geodesic distance, and to identify a turning point, either along a holding of current heading by a trajectory alignment, or along the current flight plan, by trajectory shortening, followed by direct flight towards the convergence point.

* * * * *